(12) United States Patent
Beck et al.

(10) Patent No.: US 10,754,061 B2
(45) Date of Patent: Aug. 25, 2020

(54) SYSTEMS AND METHODS FOR EVENT-BASED MODELING OF RUNOFF AND POLLUTANT BENEFITS OF SUSTAINABLE STORMWATER MANAGEMENT

(71) Applicant: 2NDNATURE Software Inc., Santa Cruz, CA (US)

(72) Inventors: Nicole G. Beck, Santa Cruz, CA (US); Margaret Mathias, Santa Cruz, CA (US); Gary Conley, Santa Cruz, CA (US); Nathaniel Evatt, Santa Cruz, CA (US); Lisa Kanner, Fremont, CA (US)

(73) Assignee: 2NDNATURE Software Inc., Santa Cruz, CA (US)

( * ) Notice: Subject to any disclaimer, the term of this patent is extended or adjusted under 35 U.S.C. 154(b) by 0 days.

(21) Appl. No.: 16/404,520

(22) Filed: May 6, 2019

(65) Prior Publication Data

US 2019/0324170 A1    Oct. 24, 2019

Related U.S. Application Data

(63) Continuation of application No. 15/653,382, filed on Jul. 18, 2017, now abandoned.
(Continued)

(51) Int. Cl.
*G01V 99/00* (2009.01)
*G06Q 50/26* (2012.01)
(Continued)

(52) U.S. Cl.
CPC ............. *G01V 99/005* (2013.01); *G01W 1/10* (2013.01); *G01W 1/14* (2013.01); *G06Q 50/26* (2013.01)

(58) Field of Classification Search
CPC .................................................... G01V 99/005
(Continued)

(56) References Cited

U.S. PATENT DOCUMENTS

| 2005/0273300 A1* | 12/2005 | Patwardhan | ........ G06F 17/5009 703/9 |
| 2015/0019262 A1* | 1/2015 | Du | ........ G06Q 40/08 705/4 |

(Continued)

OTHER PUBLICATIONS

Petrucci et al., "The dilemma of spatial representation for urban hydrology semi-distributed modelling", 2014, Journal of Hydrology, p. 997-1007. (Year: 2014).*
(Continued)

*Primary Examiner* — Hien D Khuu
(74) *Attorney, Agent, or Firm* — KPPB LLP

(57) ABSTRACT

Systems and methods in accordance with embodiments of the invention are software models that present information in a format directly usable by stormwater managers to inform annual program decisions and consistently evaluate the effectiveness of stormwater management actions. Stormwater modeling systems in accordance with many embodiments of the invention provide a tool that can be used by stormwater managers to estimate load reductions. In a number of embodiments, a user interface is provided that streamlines user input data requirements. In this way, the stormwater modeling system can extend the utility of event-based model inputs, generate results that inform management decisions, and demonstrate progress using a common scalable unit.

13 Claims, 9 Drawing Sheets

Related U.S. Application Data

(60) Provisional application No. 62/534,173, filed on Jul. 18, 2017, provisional application No. 62/363,763, filed on Jul. 18, 2016.

(51) Int. Cl.
*G01W 1/10* (2006.01)
*G01W 1/14* (2006.01)

(58) Field of Classification Search
USPC .......................................................... 702/2
See application file for complete search history.

(56) References Cited

U.S. PATENT DOCUMENTS

2018/0017710 A1 1/2018 Beck et al.
2018/0127286 A1* 5/2018 Chung ..................... C02F 1/74

OTHER PUBLICATIONS

"BMP RAM: Field Protocols v3.1", 2NDNATURE LLC, Aug. 2016, Retrieved from: http://www.2ndnaturellc.com/wp-content/uploads/2016/09/BMPRAMFieldProtocols3.1.pdf.
"BMP RAM: Technical Document v3.1", 2NDNATURE LLC, Nov. 2016, Retrieved from: http://www.2ndnaturellc.com/wp-content/uploads/2016/11/BMPRAMv3-1_TechnicalDoc_Nov2016.pdf.
"BMP RAM: User Guidance v3.2", 2NDNATURE LLC, Mar. 30, 2017, Retrieved from: http://www.2ndnaturellc.com/wp-content/uploads/2016/09/BMPRAMUserGuidance3.1.pdf.
"Delineate Urban Catchments: Guidance for Creating Catchment Boundaries and Attributes v3.1", 2NDNATURE LLC, Jul. 2017, Retrieved from: http://www.2ndnaturellc.com/documents/MS4_Mapping_Guidance.pdf
"ParcelRAM: Technical and User Guidance Document v1", 2NDNATURE LLC, Aug. 2016, Retrieved from: https://2nteir.com/parcelram/dist/prod/data/ParcelRAMTechDoc_Web.pdf.
"Stormwater Tool to Estimate Load Reductions: Final Technical Document v1.1", 2NDNATURE LLC, Mar. 2017, Retrieved from: http://www.2ndnaturellc.com/documents/swTELR_TechDoc.pdf.
"Focused Stormwater Monitoring to Validate Water Quality Source Control and Treatment Assumptions", 2NDNATURE, LLC, Final Technical Report, Mar. 2010, 118 pgs.
"Focused Stormwater Quality Monitoring", 2NDNATURE, LLC, Final Technical Report, Jun. 2012, 149 pgs (presented in two parts).
"HEC 19-Hydrology", Federal Highway Administration (FHWA), Design Manual, Report No. FHWA 1P-84-15, 303 pgs (presented in two parts).
"Municipal Separate Storm Sewer System (MS4) Main Page", United States Environmental Protection Agency, Retrieved from: http://water.epa.gov/polwaste/npdes/stormwater/Municipal-Separate-Storm-Sewer-System-MS4-Main-Page.cfm, Aug. 2, 2014, 3 pgs.
"Municipal Separate Storm Sewer System Discharge Permit", Maryland Department of the Environment, National Pollutant Discharge Elimination System, Permit No. 11-DP-2215 MD0068292, Dec. 27, 2013, 37 pgs.
"Nutrient and Siltation TMDL Development for Wissahickon Creek, Pennsylvania", U.S. Environmental Protection Agency, Final Report, Oct. 2003, 233 pgs.
"Our Built and Natural Environments: A Technical Review of the Interactions Among Land Use, Transportation, and Environmental Quality", United States Environmental Protection Agency, EPA 231K13001, Second Edition, Jun. 2013, 148 pgs.
"Pollutant Load Reduction Model (PLRM)", Northwest Hydraulic Consultants, Inc., Geosyntec Consultants, Inc., 2NDNATURE, LLC, Model Development Document, Oct. 2009, 163 pgs.
"Pollutant Load Reduction Model Quick Start Guide", Northwest Hydraulic Consultants, Inc., Geosyntec Consultants, Inc., 2NDNATURE, LLC, Version 2.1, Feb. 2015, 21 pgs.
"Time of Concentration", United States Department of Agriculture, Part 630 Hydrology National Engineering Handbook, 210-VI-NEH, Chapter 15, May 2010, 29 pgs.
"Urban Catchment Monitoring to Evaluate Tahoe TMDL Tools", 2NDNATURE, LLC, Final Technical Report, Jun. 2014, 127 pgs.
"Urban Hydrology for Small Watersheds", United States Department of Agriculture, Technical Release 55, Jun. 1986, 83 pgs.
"Waste Discharge Requirements (WDRs) for Storm Water Discharges from Small Municipal Separate Storm Sewer Systems (Ms4s) (General Permit)", California State Water Resources Control Board, Water Quality Order No. 2013-0001-DWQ, National Pollutant Discharge Elimination System (NPDES), General Permit No. CAS000004, Feb. 5, 2013, 105 pgs.
Ahiablame et al., "Effectiveness of Low Impact Development Practices: Literature Review and Suggestions for Future Research", Water, Air, & Soil Pollution, vol. 223, No. 7, Sep. 2012, pp. 4253-4273.
Arnold Jr. et al., "Impervious Surface Coverage: The Emergence of a Key Environmental Indicator", Journal of the American Planning Association, vol. 62, No. 2, Spring 1996, pp. 243-258.
Beck et al., "An urban runoff model designed to inform stormwater management decisions", Journal of Environmental Management, 193 (2017), pp. 257-269.
Bedan et al., "Stormwater Runoff Quality and Quantity From Traditional and Low Impact Development Watersheds", Journal of the American Water Resources Association, vol. 45, No. 4, Aug. 2009, pp. 998-1008.
Beven, "Changing Ideas in Hydrology—The Case of Physically-Based Models", Journal of Hydrology, vol. 105, 1989, pp. 157-172.
Beven et al., "A guide to good practice in modeling semantics for authors and referees", Water Resources Research, vol. 49, Aug. 26, 2013, pp. 5092-5098.
Bhaduri et al., "Assessing Watershed-Scale, Long-Term Hydrologic Impacts of Land-Use Change Using a GIS-NPS Model", Environmental Management, vol. 26, No. 6, 2000, pp. 643-658.
Bicknell et al., "Hydrological Simulation Program—FORTRAN User's Manual for Version 11", United States Environmental Protection Agency, National Exposure Research Laboratory, EPA/600/SR-97/080, Aug. 1997, 2 pgs.
Brander et al., "Modeled Impacts of Development Type on Runoff Volume and Infiltration Performance", Journal of the American Water Resources Association, vol. 40, No. 4, Aug. 2004, pp. 961-970.
Brezonik et al., "Analysis and predictive models of stormwater runoff volumes, loads, and pollutant concentrations from watersheds in the Twin Cities metropolitan area, Minnesota, USA", Water Research, vol. 36, No. 7, 2002, pp. 1743-1757.
Dotto et al., "Comparison of different uncertainty techniques in urban stormwater quantity and quality modelling", Water Research, vol. 46, No. 8, May 15, 2012, pp. 2545-2558.
Dotto et al., "Impacts of measured data uncertainty on urban stormwater models", Journal of Hydrology, vol. 508, Jan. 16, 2014, pp. 28-42.
Elliott et al., "A review of models for low impact urban stormwater drainage", Environmental Modelling & Software, vol. 22, Mar. 3, 2006, pp. 394-405.
Freni et al., "Assessment of the integrated urban water quality model complexity through identifiability analysis", Water Research, vol. 45, No. 1, Jan. 2011, pp. 37-50.
Fry et al., "Identifying streamgage networks for maximizing the effectiveness of regional water balance modeling", Water Resources Research, vol. 49, No. 5, Apr. 5, 2013, pp. 2689-2700.
Gilroy et al., "Spatio-temporal effects of low impact development practices", Journal of Hydrology, vol. 367, No. 3-4, Apr. 15, 2009, pp. 228-236.
Gove et al., "Effects of Scale on Land Use and Water Quality Relationships: A Longitudinal Basin-Wide Perspective", Journal of the American Water Resources Association, vol. 37, No. 6, Dec. 2001, pp. 1721-1734.
Harmel et al., "Cumulative Uncertainty in Measured Streamflow and Water Quality Data for Small Watersheds", Transactions of the American Society of Agricultural and Biological Engineers, vol. 49, No. 3, 2006, pp. 689-701.

(56) References Cited

OTHER PUBLICATIONS

Hawkins et al., "Runoff Curve Number Method: Examination of the Initial Abstraction Ratio", Proceedings of the Second Federal Interagency Hydrologic Modeling Conference, Las Vegas, Nevada. U.S. Geological Survey, Lakewood, Colorado, 2002, CD-ROM, 16 pgs.
Heaney et al., "Storm Water Management Model: Level 1—Preliminary Screening Procedures", Environmental Protection Technology Series, EPA-600/2-76-275, Project No. R-802411, Oct. 1976, 94 pgs.
Holman-Dodds et al., "Evaluation of Hydrologic Benefits of Infiltration Based Urban Storm Water Management", Journal of the American Water Resources Association, vol. 39, No. 1, Feb. 2003, pp. 205-215.
Hossain et al., "Advances in Landscape Runoff Water Quality Modelling: A Review", Landscape Dynamics, Soils and Hydrological Processes in Varied Climates, Chapter 12, Jul. 22, 2015, pp. 225-257.
Jiang, "Investigation of Runoff Curve Number Initial Abstraction Ratio", University of Arizona, Thesis, 2001, 120 pgs.
Karr, "Defining and measuring river health", Freshwater Biology, vol. 41, Mar. 1999, pp. 221-234.
Kokkonen et al., "A comparison of metric and conceptual approaches in rainfall-runoff modeling and its implications", Water Resources Research, vol. 37, No. 9, Sep. 2001, pp. 2345-2352.
Leavesley et al., "A modular approach to addressing model design, scale, and parameter estimation issues in distributed hydrological modelling", Hydrological Processes, vol. 16, 2002, pp. 173-187.
Li et al., "Sensitivity Analysis for Urban Drainage Modeling Using Mutual Information", Entropy, vol. 16, Nov. 3, 2014, pp. 5738-5752.
Lim et al., "Effects of Initial Abstraction and Urbanization on Estimated Runoff Using CN Technology", Journal of the American Water Resources Association, vol. 42, No. 3, Jun. 2006, pp. 629-643.
Mathevet et al., "A bounded version of the Nash-Sutcliffe criterion for better model assessment on large sets of basins", Large Sample Basin Experiments for Hydrological Model Parameterization: Results of the Hydrological Model Parameter Experiment, IAHS Publication 307, 2006, pp. 211-219.
Meals et al., "Lag Time in Water Quality Response to Best Management Practices: A Review", Journal of Environmental Quality Abstract—Reviews and Analyses, vol. 39, No. 1, Jan. 2010, pp. 85-96.
Michel et al., "Soil Conservation Service Curve Number method: How to mend a wrong soil moisture accounting procedure?", Water Resources Research, vol. 41, No. 2, Feb. 12, 2005, 6 pgs.
Nash et al., "River Flow Forecasting Through Conceptual Models Part I—A Discussion of Principles", Journal of Hydrology, vol. 10, 1970, pp. 282-290.
National Research Council, "Urban Stormwater Management in the United States", National Academies Press, Mar. 17, 2009, 610 pgs (presented in three parts).
Perrin et al., "Does a large number of parameters enhance model performance? Comparative assessment of common catchment model structures on 429 catchments", Journal of Hydrology, vol. 242, No. 3-4, Feb. 28, 2001, pp. 275-301.
Rauch et al., "Deterministic modelling of integrated urban drainage systems", Water Science and Technology, vol. 45, No. 3, 2002, pp. 81-94.
Reed et al., "Overall distributed model intercomparison project results", Journal of Hydrology, vol. 298, No. 1-4, Oct. 1, 2004, pp. 27-60.
Rode et al., "Uncertainties in selected river water quality data", Hydrology and Earth System Sciences, vol. 11, No. 2, Feb. 13, 2007, pp. 863-874.
Rossman, "National Stormwater Calculator User's Guide", Environmental Protection Agency, EPA/600/R-13/085, Jul. 2013, 60 pgs.
Rossman, "Storm Water Management Model—User's Manual Version 5.0", U.S. Environmental Protection Agency, EPA/600/R-05/040, 2008, Revised: Jul. 2010, 295 pgs.
Shi et al., "Research on the SCS-CN initial abstraction ratio using rainfall-runoff event analysis in the Three Gorges Area, China", CATENA, vol. 77, No. 1, Apr. 15, 2009, pp. 1-7.
Tang et al., "Forecasting land use change and its environmental impact at a watershed scale", Journal of Environmental Management, vol. 76, No. 1, Jul. 2005, pp. 35-45.
Tomer et al., "The challenge of documenting water quality benefits of conservation practices: a review of USDA-ARS's conservation effects assessment project watershed studies", Water Science & Technology, vol. 64, No. 1, Jul. 1, 2011, pp. 300-310.
Voskamp et al., "Planning support system for climate adaptation: Composing effective sets of blue-green measures to reduce urban vulnerability to extreme weather events", Building and Environment, vol. 83, Jan. 2015, pp. 159-167.
Walsh et al., "Principles for urban stormwater management to protect stream ecosystems", Freshwater Science, vol. 35, No. 1, Mar. 2016, 14 pgs.
Xian et al., "Change of Impervious Surface Area between 2001 and 2006 in the Conterminous United States", Photogrammetric Engineering and Remote Sensing, vol. 77, No. 8, 2011, pp. 758-762.
Zoppou, "Review of urban storm water models", Environmental Modelling & Software, vol. 16, No. 3, Apr. 2001, pp. 195-231.

* cited by examiner

SYSTEMS AND METHODS FOR EVENT-BASED MODELING OF RUNOFF AND POLLUTANT BENEFITS OF SUSTAINABLE STORMWATER MANAGEMENT

CROSS-REFERENCE TO RELATED APPLICATIONS

The current application is a continuation of U.S. patent application Ser. No. 15/653,382, entitled "Systems and Methods for Event-based Modeling of Runoff and Pollutant Benefits of Sustainable Stormwater Management" filed Jul. 18, 2017, which claims priority under 35 U.S.C. 119(e) to U.S. Provisional Patent Application Ser. No. 62/534,173, entitled "Systems and Methods for Event-based Modeling of Runoff and Pollutant Benefits of Sustainable Stormwater Management", filed Jul. 18, 2017 and U.S. Provisional Patent Application Ser. No. 62/363,763, entitled "Systems and Methods for Event-based Modeling of Stormwater Runoff", filed Jul. 18, 2016. The disclosures of U.S. application Ser. Nos. 15/653,382, 62/534,173 and 62/363,763 are hereby incorporated by reference in their entireties.

FIELD OF THE INVENTION

The present invention relates generally to geographic information systems and more specifically to event-based modeling of stormwater runoff and pollutants.

BACKGROUND

The hydrologic impacts associated with urban development are well documented and include a decline in downstream receiving water quality. Increased peak and total stormwater runoff volumes are the result of impervious development and decreased potential for surface infiltration. Additional water quality impairments are linked to the elevated generation and surface water transport of sediment, nutrients, bacteria, metals, pesticides, and other chemicals derived from urban land uses.

Urban municipalities expend resources to reduce non-point source urban pollutant loading to receiving waters and include a suite of non-structural and structural best management practices (BMPs). Non-structural BMPs focus on source control and pollution prevention, including street sweeping programs and parcel runoff controls like rain barrels or disconnected downspouts. Structural BMPs are physical features installed on the landscape to reduce stormwater runoff volumes and treat stormwater pollutants. Structural BMPs include low impact developments (LIDs) and green infrastructure BMPs such as infiltration or bio-retention features, as well as larger scale centralized BMPs such as dry basins or treatment vaults.

There are significant challenges in implementing an appropriate experimental design and data analysis procedure to confidently isolate pollutant load reductions attributable to a single or a suite of conservation efforts. One challenge is related to the lag time between the implementation of effective actions and the measurable response in the receiving waters beyond hydrologic variability. This lag time limits the immediate use of water quality data to guide impending decisions and stormwater program adjustments. The critical concept of maximizing the ability to make inferences about surface water health and minimizing the influences of natural seasonal or geographic variations are often overlooked. Such oversights can elevate data collection, management, and laboratory costs at the expense of developing a reliable and rigorous sampling and post-sampling procedure. If not well planned, sampling strategies can introduce ambiguity to measurements and reduce confidence that changes in pollutant loads over time can be attributed to management actions. Collection of water quality and hydrologic data is costly, complicated, and inherently spatially and temporally limited. Stormwater managers continue to struggle with how to effectively incorporate monitoring data and results into annual resource allocation decisions. Stormwater modeling allows for the simulation of a range of potential hydrologic conditions and the spatial aggregation of water quality benefits from multiple structural and non-structural BMPs. The use of a wide array of urban hydrology models to inform both short and long-term stormwater programmatic planning decision is common.

SUMMARY OF THE INVENTION

Systems and methods for event-based modeling of runoff and pollutants in accordance with embodiments of the invention are illustrated. One embodiment includes a method for managing water management features of a geographic area by gathering spatial data describing a set of land portions, gathering water management feature data for a set of water management features, gathering land and feature condition data describing a condition of at least one land portion and at least one water management feature, calculating precipitation level patterns, calculating an aggregate effect of the set of water management features based on the spatial data, the water management feature data, the land and feature condition data, and the calculated precipitation level patterns, and managing water management features to reduce the calculated aggregate effect of the plurality of water management features.

In another embodiment, the spatial data comprises at least one of land surface type, soil type, precipitation levels, topography, hydrologic connection to receiving waters, traffic levels, and land use type.

In a further embodiment, the water management feature data comprises at least one of the size of a water management feature, types of outflow from the water management feature, construction materials used to construct the water management feature, and outflow rates from the water management feature.

In still another embodiment, gathering land and feature condition data comprises performing a set of standardized assessment methods on each land portion in a geographic area.

In yet another embodiment, gathering land and feature condition data comprises performing a set of standardized assessment methods on each water management feature in a geographic area.

In another additional embodiment, calculating the precipitation level patterns comprises calculating an annualized statistical distribution of rainfall events of a geographic area.

In a further additional embodiment, calculating the expected aggregate effect comprises discounting the effectiveness of a water management feature based on a condition of the water management feature from the land and feature condition data.

In another embodiment again, calculating the aggregate effect comprises calculating an effect for each land portion and aggregating the effects of the land portions to calculate the aggregate effect.

In a further embodiment again, aggregating the effects of the land portions comprises identifying flow routing data that describes the flow of runoff between land portions and calculating the aggregate effect based on the effect for each land portion and the flow routing data the portion and at least one neighboring land portion.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

Turning now to the drawings, stormwater runoff and pollutant modeling systems and methods for modeling stormwater runoff in accordance with various embodiments of the invention are illustrated. Stormwater modeling systems and methods of modeling stormwater runoff in accordance with various embodiments of the invention are discussed further below. Before discussing these systems, however, various characteristics of a model for modeling stormwater runoff according to a number of embodiments of the invention is described in further detail below.

Stormwater Model

A stormwater model in accordance with some embodiments of the invention is used to model and predict the effectiveness of stormwater management features in reducing stormwater runoff to a specific receiving water, such as a stream, lake or river. Alternatively, or conjunctively, the stormwater model is used to model and predict the effectiveness of stormwater management features in reducing pollutants that are introduced to the receiving waters.

Figure 1:
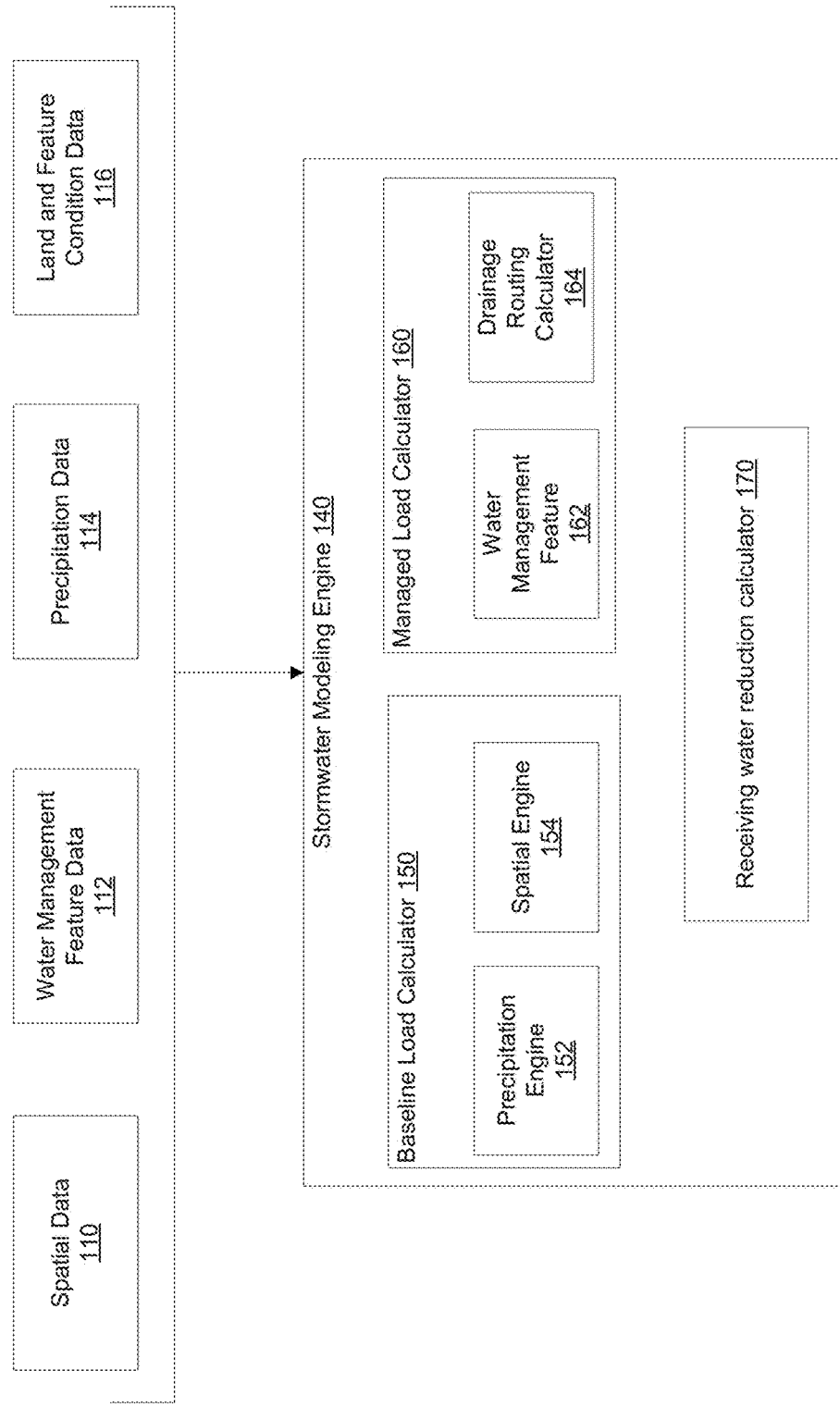
FIG. 1 is a block diagram conceptually illustrating a stormwater model for modeling stormwater in accordance with an embodiment of the invention.

A stormwater model in accordance with various embodiments of the invention is illustrated in FIG. 1. The example of FIG. 1 illustrates a stormwater modeling engine 140, along with various inputs that are used for the modeling of stormwater according to many embodiments of the invention. The inputs include spatial data 110, water management feature data 112, precipitation data 114, and land and feature condition data 116.

Overly burdensome input data requirements for setup, calibration, and validation of models is a barrier for appropriate use by stormwater managers who are very often not hydrologic modelling experts. Since catchment heterogeneity generally occurs at spatial scales much finer than can be measured or represented in a model, even the most detailed input data sets have important limitations for characterizing catchments. In many embodiments, the inputs that are required for the stormwater modeling engine are greatly simplified and can be measured in an objective and repeatable fashion. In several embodiments, the various inputs (e.g., inputs 110-116 of FIG. 1) are gathered and collected from various sources including, but not limited to, municipal databases, satellite and aerial images, crowdsourced images, sensors, and results captured through various standardized assessment methods.

The inputs of the example described in FIG. 1 includes spatial data 110. Spatial data in accordance with many embodiments of the invention include various characteristics about the land (e.g., catchments, roads, and water management features), including (but not limited to) land surface type, soil type, precipitation levels, topography, hydrologic connection to receiving waters, traffic levels, and land use type. These characteristics are grouped into discrete urban catchments that represent accurate sub-drainages of urbanized areas. In some embodiments, the spatial data is used by the stormwater model to quantify a baseline for stormwater runoff and/or pollution generation based on the land characteristics.

Stormwater models vary widely in terms of how the catchment characteristics that generate the magnitude and timing of runoff are defined. Land cover or land use inputs range from simple distinctions between impervious and pervious land cover to estimating the fraction of directly connected impervious surfaces within multiple land use types. The stormwater model according to a number of embodiments of the invention estimates stormwater runoff volume on a land use basis using a standardized series of land use types. For example, in certain embodiments, the land use types for parcels of land include, but are not limited to, industrial use, residential use, and cultivated use. Alternatively, or conjunctively, roads may be classified based not only on their type (e.g., paved, unpaved, gravel, etc.), but on the level of traffic of the road (e.g., high, medium, low, etc.).

With regards to soil types, the stormwater model in accordance with certain embodiments utilize specific soil infiltration rates from hundreds of soil types defined by the Natural Resources Conservation Service (NRCS) while, in other embodiments, the stormwater model permits the selection of one of four NRCS hydrologic soil groups.

In a number of embodiments, the spatial data is collected from various public data sets. Alternatively, or conjunctively, the spatial data is collected by analyzing various information. For example, the spatial data according to certain embodiments of the invention includes data that is gathered through machine vision analyses of satellite imagery to determine such various characteristics about the land.

In the example described with reference to FIG. 1, the inputs further include water management feature data 112. In several embodiments, water management feature data includes various information about water management features that can be used to calculate the effectiveness of each water management feature in reducing stormwater runoff and/or reducing pollutants that flow to receiving waters. Water management features, as used in this application, is used to generally describe various practices, structures, and/or other features of a geographic area that can be built or applied in order to manage stormwater in the geographic area. Water management features in accordance with many embodiments of the invention include (but are not limited to) water management policies, as well as structural and non-structural best management practices (BMPs). Non-structural BMPs focus on source control and pollution prevention, such as road street sweeping programs or runoff generation reduction from urban parcels. Structural BMPs are physical features specifically designed and installed to reduce stormwater runoff volumes and to treat stormwater pollutants generated from roads, parcels or larger mixed land use drainage areas.

The water management feature data in accordance with several embodiments of the invention includes various characteristics of a BMP, including (but not limited to) the size of the BMP, the types of outflow, construction materials, and/or outflow rates. Stormwater modeling systems in accordance with a number of embodiments of the invention can easily account for both structural and nonstructural stormwater BMPs of various types, sizes, and applications. In many embodiments, the stormwater model uses water management feature data that incorporates a standardized sizing regime and only requires the input of the fraction of impervious area treated by BMPs for an entire catchment. Alternatively, or conjunctively, the stormwater model may require specific BMP dimensions using field measurements or storm size criteria. Beyond the structural characteristics and original design specifications, it is also possible to estimate the single and combined effectiveness of these BMPs at infiltrating runoff and treating pollutants in stormwater.

In the example described with reference to FIG. 1, the inputs further include precipitation data 114. Precipitation data in accordance with many embodiments of the invention includes historic precipitation levels for a specified period of time, such as, but not limited to a 30-year span. In some embodiments, the historic precipitation data includes daily rainfall levels at a specified geographic level (e.g., per catchment), allowing the stormwater model to calculate percentile events for rainfall for each geographic region. As many water management features are designed to treat volumes generated from relatively high intensity precipitation events, the effectiveness of a water management features may not be linearly related to rainfall, but rather dependent on the size of a storm. Accordingly, the stormwater model in accordance with many embodiments of the invention calculates annualized percentile rainfall events to more accurately compute the baseline runoff levels and/or pollutant levels, as well as the effects of water management features in these levels. While it is important to use precipitation information that is relevant to a specific catchment over space and time and obtain a reasonable average annual runoff estimate, the stormwater model in accordance with a number of embodiments of the invention does not account for the nuances of seasonal and internal climate variability, as they are not necessary to model the long-term benefit of effective management actions.

The illustrated inputs to the stormwater model of FIG. 1 include land and feature condition data 116. Land and feature condition data in accordance with several embodiments of the invention describe the condition of the land and water management features. While the spatial data and water management feature data describes many of the unchanging characteristics of the land, the land and feature condition data describes the condition of the land and/or water management features.

In many embodiments, precise inspection procedures consisting of standardized assessment methods are used to assess parcel runoff potential, road pollutant generation potential, and structural BMP performance relative to sustainable standards. The standardized assessment methods in accordance with some embodiments of the invention employ standardized sets of field observations to ensure a consistent and repeatable measurement of each land area and/or water management feature. Alternatively, or conjunctively, the land and feature condition data includes information about the land and/or water management features that is gathered remotely through a variety of methods, such as, but not limited to, sensor readings and image analysis of aerial and/or satellite imagery.

The stormwater model according to several embodiments of the invention calculates a score or description of the condition of each land area (e.g., parcels and catchments) and/or water management feature. An urban parcel is determined to be 'runoff neutral' when standardized visual observations indicate that much of the precipitation falling on the parcel does not leave as runoff. The assessment of the condition of a land area may also include other elements such as (but not limited to) trash levels and road conditions. In some embodiments, a standardized assessment method (e.g., Parcel RAM™) is used to assess and document land areas (e.g., to identify runoff neutral parcels, trash levels, etc.). Parcel RAM™ is a standardized geospatial data collection, management and reporting tool for assessing the condition of land parcels and is described in greater detail in "ParcelRAM: Technical and User Guidance Document v1" (available at https://2ntelr.com/parcelram/dist/prod/data/ParcelRAMTechDoc_Web.pdf), which is submitted herewith via Information Disclosure Statement and incorporated herein by reference.

In many embodiments, standardized assessment methods (e.g., Road RAM™) are used to assess and document the relative pollutant generation threat of urban roads. Road RAM™ is a standardized geospatial data collection, management and reporting tool for assessing the condition of roads.

In several embodiments, standardized assessment methods (e.g., BMP RAM™) are used to assess and document the performance and relative maintenance urgency of implemented water management features. In a number of embodiments, the land and feature condition data for the water management features serve as measures of the localized effectiveness of the implemented stormwater management runoff and pollutant controls over time and space. BMP RAM™ is a standardized geospatial data collection, management and reporting tool for assessing the condition of BMPs and is described in further detail in "BMP RAM: User Guidance v3.2" (available at http://www.2ndnaturellc.com/wp-content/uploads/2016/09/BMPRAMUserGuidance3.1.pdf), "BMP RAM: Technical Document v3.1" (available at http://www.2ndnaturellc.com/wp-content/uploads/2016/11/BMPRAMv3-1_TechnicalDoc_Nov2016.pdf), and "BMP RAM: Field Protocols v3.1" (available at http://www.2ndnaturellc.com/wp-content/uploads/2016/09/BMPRAMFieldProtocols3.1.pdf), which are submitted herewith via Information Disclosure Statement and incorporated herein by reference. Additional embodiments may utilize other assessment methods and inputs as appropriate to the particular application.

In the example of FIG. 1, the various data 110-116 serve as inputs to stormwater modeling engine 140. Stormwater modeling engine 140 includes a baseline load calculator 150, managed load calculator 160, and receiving water reduction calculator 170.

Baseline load calculator 150 in accordance with many embodiments of the invention calculates a baseline (or unmodified) load to a set of receiving waters. In certain embodiments, the baseline load calculator defines the fraction of flow that infiltrates over pervious surfaces and the fraction of overland runoff that is eventually discharged to the receiving waters. In many embodiments, the baseline load includes runoff and/or pollutant loads that make it into the receiving waters based on various characteristics of the land surrounding the receiving waters including (but not limited to) land surface type, soil type, precipitation levels, topography, hydrologic connection to receiving waters, and land use type. These characteristics are grouped into discrete urban catchments that represent accurate sub-drainages of urbanized areas. In some embodiments, the underlying urban geography and stormwater volumes are used to quantify baseline stormwater runoff and pollutant generation of a given urban drainage, delineated into smaller urban catchments on the order of 100 acres.

Stormwater volume metrics can serve as cost-effective proxies for pollutant loading in urban landscapes. While pollutant concentrations in urban catchments may depend on factors such as antecedent rainfall conditions, storm duration, intensity, etc., urban pollutant loads have been shown to depend primarily on runoff event volumes. Since the annual runoff is a summation of events throughout the year, it is reasonable to infer dependence of the annual loading on annual runoff volumes in urban catchments, just as it has been shown in other types of catchments.

In the example of FIG. 1, baseline load calculator 150 includes spatial engine 152 and precipitation engine 154. Spatial engine 152 in accordance with some embodiments of the invention models the effects of the input spatial data collected regarding the land area and water management features. The spatial data regarding the land area can be used to determine a baseline load for runoff and/or pollutants based on characteristics of the land itself, while the spatial data regarding the water management features can be used to determine the effect of the water management features on reducing the baseline load.

In various embodiments, spatial engine 152 uses water management feature data to compute the effects of large scale centralized structural BMPs (e.g., treatment vaults, infiltration basins, or dry basins), which typically treat stormwater runoff from mixed land use catchments and have treatment capacities on the order of an acre-foot. Stormwater can exit a centralized BMP in one of three ways: soil infiltration, through a treatment aperture, or via bypass where no treatment or detention occurs. Some models also include evaporative losses, but given proper functioning, structural BMPs should have drawdown times on the order of hours and evaporation can be assumed negligible. The relative components of volume loss depend on the BMP type and design specifics. For example, an infiltration BMP has only infiltrated and bypassed volumes, while a treatment vault has only treated and bypassed volumes (no infiltration)

Precipitation engine 154 in accordance with a number of embodiments of the invention uses precipitation data to compute predicted rainfall levels for the land area. In many embodiments, precipitation engine 154 uses an approach that brackets the seasonal and inter-annual variability demonstrated by historic precipitation data from any climatic region in order to focus on long-term average annual runoff volumes. The long-term average annual runoff volumes allow the stormwater modeling engine in accordance with several embodiments to provide a comparison of various water management plans by using a set of fixed precipitation inputs for multiple scenarios over a period of multiple years.

For example, in several embodiments, precipitation engine 154 uses a probabilistic approach to determine local precipitation patterns to estimate average daily runoff from multiple 24-hr events rather than using a single rainfall-runoff ratio. To isolate the water quality benefit signal as a result of management actions (e.g. structural and non-structural BMPs), the same precipitation inputs are used in all of the modeled scenarios for each urban catchment. Additional embodiments may utilize other inputs and methods for calculating baseline loads as appropriate to the particular application.

Managed load calculator 160 in accordance with some embodiments is used to calculate the load at the catchment level, based on the spatial features and precipitation levels calculated by the baseline load calculator 150. In the example of FIG. 1, managed load calculator 160 includes water management feature module 162 and drainage routing module 164. The water management feature module in accordance with various embodiments of the invention is used for calculating the effects of water management features in reducing the calculated baseline load, which is calculated based on calculated precipitation levels and effects of the various land areas.

In certain embodiments, the water management feature module models water management features, such as (but not limited to) centralized BMPs, using the USDA TR-55 (1986) methodology for estimating peak inflow and peak outflow. Calculations for infiltrated, treated, and bypassed stormwater runoff volumes are completed for each prescribed 24-hr percentile storm event. Average annual infiltrated, treated, and bypassed stormwater volumes are estimated using the trapezoid rule and the average number of rain days per year. In some embodiments, the water management feature module calculates the effects based on the characteristics of the water management features, including (but not limited to) the size of the water management feature, whether the feature filters the water, the types of outflow, construction materials, and/or outflow rates. In some embodiments, the effects of the water management features are calculated for portions (e.g., parcels and/or catchments) of a geographic region that feed into one or more receiving waters.

Spatially distributed models can incorporate flow routing across different land use types rather than lumping similar land use types within a catchment. Drainage routing module 164 calculates receiving runoff based on interactions of calculated loads (e.g., stormwater runoff and/or pollutant generation) between the portions and/or water management features of the geographic region. Draining routing module 164 in accordance with a number of embodiments of the invention calculates the routing of stormwater through a sequence of catchments and their associated water management features. For example, the simulation of flow routing through structural BMPs can vary widely depending on the characteristics of the BMP, including (but not limited to) the size of the BMP, the types of outflow, construction materials, and/or outflow rates. Drainage routing modules in accordance with a number of embodiments of the invention can account for both structural and nonstructural stormwater BMPs of various types, sizes, and applications. In some embodiments, the drainage routing module allocates the calculated loads (e.g., runoff and/or pollution) to the receiving waters in manner that is proportional to the various catchment's contributions, allowing for a user to view the paths and sources of load contributions to the receiving waters at the catchment level. Additional embodiments may utilize other inputs and methods for calculating managed loads as appropriate to the particular application.

Stormwater modeling engine 140 also includes a receiving water reduction calculator 170 for calculating the cumulative contributions from precipitation levels, land surfaces, and/or water management features to the various receiving waters in a geographic area. In certain embodiments, the receiving water reduction calculator 170 aggregates the calculations of the baseline load calculator 150 and the managed load calculator 160 for all of the urban catchments of a region to calculate the results of various analyses performed by the stormwater modeling engine, including (but not limited to) the cumulative effects to the receiving waters, the effects of various water management planning scenarios (e.g., the implementation of various water management policies, installation of new water management features, etc.), and forecasts for future stormwater and/or pollutant loads.

The receiving water module, in accordance with several embodiments of the invention, uses a coupled mass balance and hydrologic routing approach to aggregate the runoff and pollutant generation benefits of non-structural BMPs at the road and parcel source, followed by volume and load reductions achieved via detention or retention by structural BMPs prior to the volume and load eventually being discharged to the receiving waters. In a number of embodiments, the receiving water module combines the fundamental urban hydrology calculations from the U.S. Department of Agriculture with a hydrograph separation approach to handle flow partitioning and estimate runoff reductions achieved by a range of large-scale, centralized structural BMP types. Additional embodiments may utilize other inputs and methods for calculating receiving water reductions as appropriate to the particular application.

In several embodiments, the stormwater modeling engine includes a display engine (not shown) that automatically generates results in standardized formats by mapping where actions are implemented and quantifying the relative effectiveness of those actions, providing an objective and transparent approach to urban land management accounting.

While spatially distributed models often include detailed physical process representation, they don't necessarily offer the most useful outputs for users. Uncertainty commonly associated with complex stormwater models can make comparisons over time or testing heuristic scenarios difficult since the results depend strongly on model parameter values that may be poorly defined, and vary over time and space. Even where good hydrological data are available, they are often only sufficient to support reliable calibration of models of very limited complexity.

Many existing models for measuring stormwater runoff struggle to determine the specific effectiveness of actions taken to manage stormwater runoff. A model that does not exhibit hydrologic sensitivity to water management features is of little use to stormwater managers who need to use it as a planning, reporting and decision making tool. Inclusion of extraneous model components or parameters that do not result in a measurable output response can fortify a model against discerning hydrologic changes in a catchment over time. Models such as the widely used stormwater management model (SWMM) with numerous free parameters requiring user calibration often only include a few key input variables that contribute significantly to the outputs, which translates to greater uncertainty. This uncertainty reduces confidence and precision such that the results are sensitive to the effect of BMPs rather than error or variability contained within the model algorithms. Imprecise models are of little use to stormwater managers who must know where stormwater flows, where their features are located, if their features require maintenance, and what progress they are making toward improvement goals.

It is often difficult to identify a convincing demonstration of load reductions that result from effective management actions and involve a degree of change that can be detected above other sources of variability. When only short-term monitoring data is available, such changes are often difficult to detect to a high level of confidence. Current approaches to tracking and reporting these practices have yet to show compelling evidence of widespread changes in receiving water quality throughout the nation despite significant investments. To improve receiving water quality and restore associated ecological functions, the limitations of the current trajectory need to be acknowledged so that available resources can be more efficiently used to implement sustainable practices with a new degree of focus, transparency, and accountability.

In many embodiments, the stormwater modeling engine is useful in identifying areas for improvement in a geographic area. The stormwater modeling engine in accordance with several embodiments of the invention provides a detailed breakdown of the calculated load contributions at various levels, including (but not limited to) by catchment, parcel, receiving water, municipality, road, and water management feature.

Stormwater modeling engines in accordance with a number of embodiments of the invention function on the urban catchment scale, which is an appropriate unit for stormwater managers who need to evaluate and compare results to inform decisions and track environmental benefits. The urban catchment spatial scale allows users to easily set up scenarios for multiple catchments with batch uploads of tables from a geographic information system (GIS) that specifies the catchment characteristics that are utilized as model inputs. In many embodiments, various characteristics of the catchments, such as (but not limited to) boundaries and land use type, are readily available data that can be collected from data stores of a municipality.

At the catchment scale, the stormwater modeling engine in accordance with various embodiments of the invention is 'lumped' rather than distributed, meaning that calculations are performed for the catchment rather than within spatially referenced grid cells. This approach greatly limits the uncertainty in parameter calibration associated with a distributed model, and allows for the gathering of the required inputs for multiple catchments en masse using geographic information system (GIS) spatial analysis tools. In some embodiments, at least a portion of the required inputs are gathered from satellite imagery of a geographic area. The use of the catchment spatial scale aligns with manageable drainage areas where water quality improvement actions can be planned and effective actions can have measurable reductions on the quantified loading to the receiving waters on annual time scales.

With a parsimonious approach and minimal parameterization, systems and methods in accordance with several embodiments of the invention reduce uncertainty from insensitive model components to create a tool that will be appropriate for testing water management feature implementation scenarios over time and across multiple catchments. By keeping different water management feature implementation schemes and other elements of a scenario fixed, the model exhibits measurable changes in the predicted hydrologic response. The ability to forecast detailed effects of water management features across several different scenarios allows the stormwater modeling engine to provide valuable insights with regards to stormwater runoff and pollutant loading. In some embodiments, the stormwater modeling engine provides insight into the expected benefits of various stormwater management scenarios, allowing a user to identify the greatest reductions to stormwater runoff and/or pollutant loads. The stormwater modeling engine of certain embodiments provides the user with costs associated with the various stormwater management solutions, allowing the user to maximize a budget and/or minimize the costs required to meet various guidelines and regulations. Methods and systems for modeling stormwater effects according to a number of embodiments of the invention are described in further detail below.

Methods for Modeling Stormwater Runoff

Figure 2:
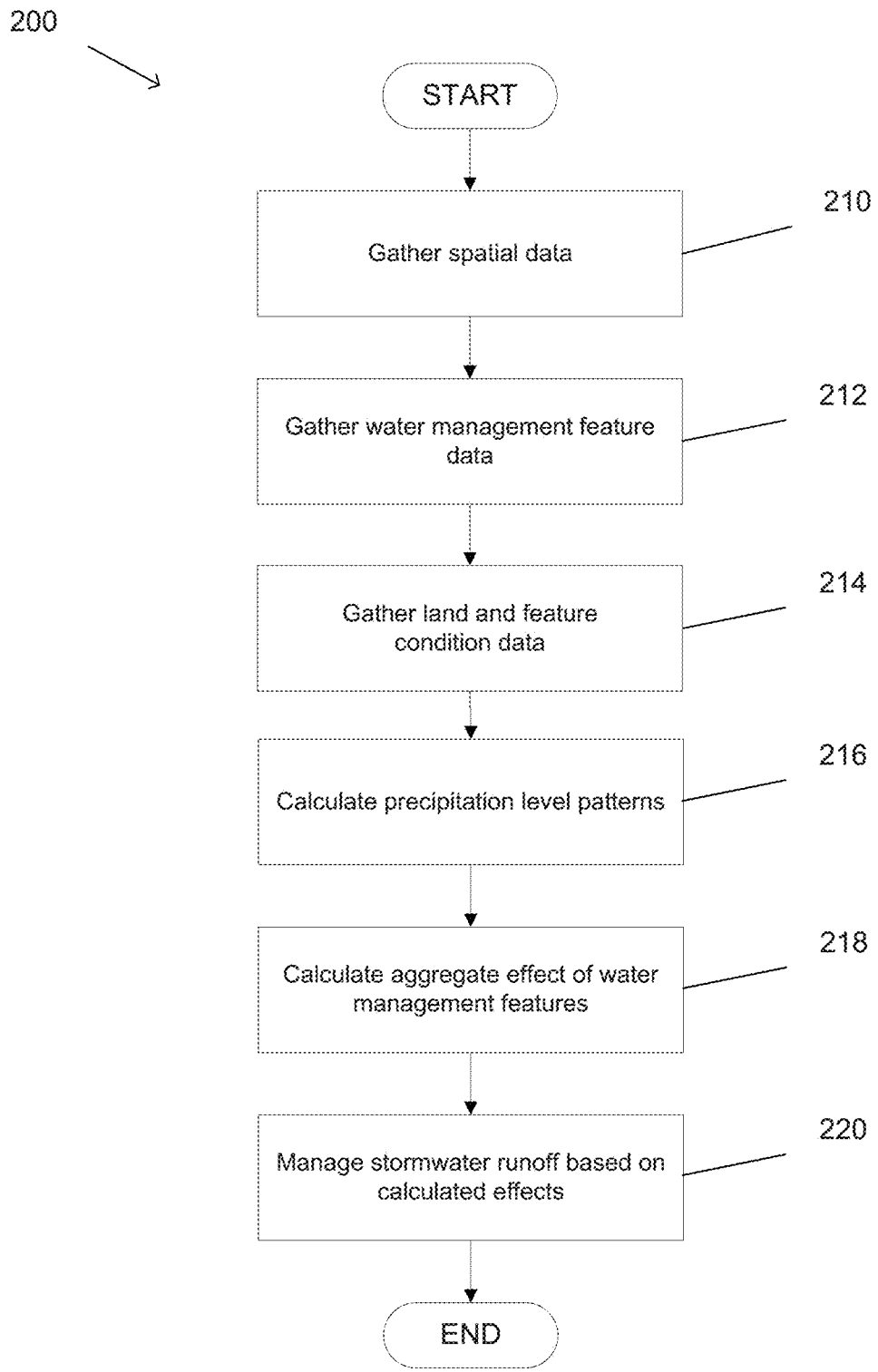
FIG. 2 is a flow chart conceptually illustrating an example of a process for modeling stormwater in accordance with an embodiment of the invention.

A process for managing stormwater runoff environments is conceptually illustrated in FIG. 2. To inform stormwater management and be usable by the municipal stormwater community, inputs to a stormwater model according to various embodiments of the invention are specified with commonly available data sources and capture the need for on-going maintenance and management to achieve sustained water quality benefits. In addition to being computationally simpler, the process for stormwater modeling in accordance with various embodiments of the invention is designed to have lower input data requirements than more sophisticated alternatives, with the aim that users can spend less time gathering, processing, and managing data. With limited inputs, it is easier to provide users of stormwater modeling systems a clear, standardized process for creating input data and running simulations. This consistency in data input generation translates to increased consistency and comparability of model results amongst users with varying levels of modeling expertise. The input formats and modeling procedure are structured to enable multiple users to represent the same features (e.g., water management features, catchments, parcels, roads, etc.) with the same available data in the same way. The results can then be used to compare area normalized runoff volumes across catchments to inform priorities where stormwater actions are likely to provide the greatest benefits to the receiving waters.

The process according to some embodiments of the invention gathers (210) spatial data that can be used to generate a description of various physical features, such as (but not limited to) land portions (e.g., urban catchments and parcels) and roads for a particular analysis. The spatial data according to several embodiments of the invention includes various characteristics of the geographic area including (but not limited to) parcel information, land use distribution, soil type, parcel condition, road information, road conditions, topography, imperviousness, existing stormwater infrastructure (e.g., water management features), and catchment connectivity. Some models incorporate a standardized sizing regime and the only user input is the fraction of impervious area treated for the entire catchment.

In some embodiments, the boundaries of each portion of land (e.g., catchments, parcels, etc.) are defined by a municipality in terms of geographic coordinates (e.g., latitude and longitude). Examples of delineating urban catchments are described in further detail in "Delineate Urban Catchments: Guidance for Creating Catchment Boundaries and Attributes v3.1" (available at http://www.2ndnaturellc.com/documents/MS4_Mapping_Guidance.pdf), which is submitted herewith via Information Disclosure Statement and incorporated by reference herein. In several embodiments, catchment boundaries and hydrologic routing are primarily determined by intersecting local stormwater infrastructure data layers and a high-resolution digital elevation model (DEM). Large drainages are split into smaller, approximately 100-acre catchments using basic flow routing principles. Often there are a series of catchments that drain to the same receiving water, and together they form a hydrologic unit that we refer to as an urban drainage. Once the catchment boundaries are finalized, a series of catchment attributes are generated using a variety of freely available spatially referenced datasets and GIS tools, and the data are organized into standardized templates and ready for upload to the stormwater modeling system. The defined boundaries are then used in various assessments and/or automated processes to classify and measure the imperviousness of each catchment. Example methods for such assessment methods are described in greater detail in "ParcelRAM: Technical and User Guidance Document v1" (available at https://2ntelr-.com/parcelram/dist/prod/data/ParcelRAMTechDoc_Web-.pdf), "BMP RAM: User Guidance v3.2" (available at http://www.2ndnaturellc.com/wp-content/uploads/2016/09/BMPRAMUserGuidance3.1.pdf), "BMP RAM: Technical Document v3.1" (available at http://www.2ndnaturellc.com/wp-content/uploads/2016/11/BMPRAMv3-1_TechnicalDoc_Nov2016.pdf), and "BMP RAM: Field Protocols v3.1" (available at http://www.2ndnaturellc.com/wp-content/uploads/2016/09/BMPRAMFieldProtocols3.1.pdf), which are submitted herewith via Information Disclosure Statement and incorporated herein by reference.

In certain embodiments, the imperviousness of the land cover and soil type for each land portion are critical inputs for estimating stormwater runoff for a given location. The imperviousness of the land cover measures the volume of water that is infiltrated by the land cover, based on the fractional area available for stormwater infiltration (1-% impervious) and the relative ability of the soil in pervious areas to absorb and infiltrate water. In many cases, the percent impervious (PIA) of any land use type varies within and across municipal separate storm sewer systems (MS4s). The process according to some embodiments of the invention accounts for PIA variability by creating a consistent and repeatable approach to estimate the PIA for each land use type via a series of empirical equations.

Alternatively, or conjunctively, the process according to some embodiments of the invention gathers spatial data, such as (but not limited to) the percent impervious of a catchment (PIAC), from images of the catchment, such as (but not limited to) satellite and/or aerial imagery. Determining the PIAC using such imagery has two benefits. First, images that capture such impervious coverage data is widely available, can be easily accessed by any municipality, and provides consistency across municipalities. Second, catchment images incorporate the urban tree canopy to estimate overall impervious area, allowing for the incorporation of the benefits that urban trees provide in the actual rainfall-runoff transformation in urban drainages. In some embodiments, any of a variety of machine vision and machine learning methods are applied to the images for any of a variety of applications, including (but not limited to) the identification of catchments, determination of the PIAC for each catchment, and the classification of land use for each catchment.

The process according to a number of embodiments gathers spatial data related to land use using a standardized series of land use types. For example, in certain embodiments, the land use types for parcels of land include, but are not limited to, industrial use, residential use, and cultivated use. Alternatively, or conjunctively, roads may be classified based not only on their type (e.g., paved, unpaved, gravel, etc.), but on the level of traffic of the road (e.g., high, medium, low, etc.). In some embodiments, land use types are used to generate a baseline level of pollution load for a geographic area.

In addition to properties of the individual catchments, catchment connectivity is a critical element of generating reliable estimates of average annual runoff and loading derived from an urban catchment and delivered to a receiving water. Catchment connectivity is defined as the proportion of stormwater discharging from a catchment discharge point that reaches the receiving water and is not diverted in some way. The process according to many embodiments of the invention categorizes the catchment connectivity between catchments based on an amount of flow that enters a receiving water during different precipitation events (e.g., a storm within the xth percentile of a peak daily runoff).

In several embodiments, the process adjusts all catchment runoff and loading estimates based on the relative hydrologic connectivity of each catchment to the receiving water. The process according to many embodiments of the invention uses a systematic and consistent process to determine the relative hydrologic connectivity of a catchment to receiving waters based on the distance, substrate and visual characteristics of the flow path that physically connects the discharge point of a specific catchment to the receiving water. Examples of such processes are described in "ParcelRAM: Technical and User Guidance Document v1" (available at https://2ntelr.com/parcelram/dist/prod/data/ParcelRAMTechDoc_Web.pdf), "BMP RAM: User Guidance v3.2" (available at http://www.2ndnaturellc.com/wp-content/uploads/2016/09/BMPRAMUserGuidance3.1.pdf), "BMP RAM: Technical Document v3.1" (available at http://www.2ndnaturellc.com/wp-content/uploads/2016/11/BM-PRAMv3-1_TechnicalDoc_Nov2016.pdf), and "BMP RAM: Field Protocols v3.1" (available at http://www.2ndnaturellc.com/wp-content/uploads/2016/09/BMPRAMFieldProtocols3.1.pdf), which are submitted herewith via Information Disclosure Statement and incorporated herein by reference. Working inland from the receiving waters, all catchments that drain into another catchment inherit the same connectivity as the downstream catchment, unless credible evidence suggests some surface volume loss occurs between the two catchments.

The process 200 also gathers (212) water management feature data. The water management feature data according to some embodiments includes data for existing water management features and/or planned water management features that have not yet been implemented. In several embodiments, the water management feature data includes various characteristics of water management features (e.g., BMPs), including (but not limited to) the size of the water management feature, the types of outflow, construction materials, and/or outflow rates. The process according to certain embodiments of the invention gather the water management feature data based on structural characteristics and/or the original design specifications for each water management feature. The water management feature data according to some embodiments of the invention allows the process to estimate the single and combined effectiveness of these water management features at infiltrating runoff and treating pollutants in stormwater.

In some embodiments, the process gathers information about the type of each water management feature and/or the effects of various characteristics of a water management feature on the way that the water management feature is able to manage the flow of stormwater. For example, the characteristics that are measured in accordance with certain embodiments include (but are not limited to) whether the feature filters the water, a water capacity of the feature, as well as the size and surface material of the feature.

In many embodiments of the invention, the process gathers feature data for the proposed water management features based on the performance of similar water management features and their effects in other areas. In certain embodiments, the process applies various machine learning techniques to previously collected data regarding the effectiveness of other water management features, in conjunction with the proposed water management features, in order to predict the effectiveness of the proposed water management features.

The quantification of non-structural BMPs aligns with common practices implemented on parcels and roads. On parcels, common 'non-structural' practices are those that most importantly reduce the amount of runoff leaving a parcel. These urban parcel site design elements are common in low impact development and green infrastructure designs and include practices such as reduced use of concrete or asphalt for walkways, patios, driveways, etc., downspout disconnection, installation of French drains, routing of impervious surface runoff to pervious areas, green roofs, onsite rain capture and reuse, etc. Effective implementation of any combination of non-structural BMPs on specific parcel can effectively achieve the desired parcel condition where surface water does not exit the parcel.

The process according to many embodiments of the invention gathers (214) land and feature condition data that describes the condition of the various features (e.g., water management features, land parcels, catchments, roads, etc.). In some embodiments, the land and feature condition data is generated according to customized, standardized assessment methods (e.g., 2N RAMs™) used to quantify the performance of land portions (e.g., catchments, parcels, etc.) as well as existing water management features (e.g., structural and non-structural BMPs) implemented throughout the MS4. The assessment methods according to various embodiments of the invention are based on the knowledge of experts in sustainable land management and available monitoring data. In many embodiments of the invention, the assessment methods are repeatable, objective assessment tools whose data are direct inputs to annual runoff and loading reduction estimates.

The assessment results eliminate any assumptions regarding the effectiveness of specific actions or practices. Rather, the assessment methods provide directly observable evidence that roads, parcels and/or structural BMPs conditions are represented in the model at current conditions. This focus on water management features as assets that need to be managed will concentrate attention on the importance of effective maintenance actions towards sustaining the water quality benefits of these investments year after year.

In a number of embodiments, the gathered condition data is generated by a variety of assessment methods which employ standardized protocols for field observations. Examples of such protocols are described in further detail in "ParcelRAM: Technical and User Guidance Document v1" (available at https://2ntelr.com/parcelram/dist/prod/data/

ParcelRAMTechDoc_Web.pdf), "BMP RAM: User Guidance v3.2" (available at http://www.2ndnaturellc.com/wp-content/uploads/2016/09/BMPRAMUserGuidance3.1.pdf), "BMP RAM: Technical Document v3.1" (available at http://www.2ndnaturellc.com/wp-content/uploads/2016/11/BM-PRAMv3-1_TechnicalDoc_Nov2016.pdf), and "BMP RAM: Field Protocols v3.1" (available at http://www.2ndnaturellc.com/wp-content/uploads/2016/09/BMPRAMFieldProtocols3.1.pdf), which are submitted herewith via Information Disclosure Statement and incorporated herein by reference. In some embodiments, the process gathers the data for water management features based on an image analysis of images (e.g., satellite imagery, aerial imagery, etc.) that capture the condition of BMPs for a geographic area. Alternatively, or conjunctively, the process of many embodiments gathers data from remote sensors (or computing devices connected to such sensors) that provide additional information regarding a condition or state (e.g., water level) of a water management feature.

In many embodiments, the process 200 calculates (216) precipitation level patterns for the geographic area under consideration. Precipitation is an important factor in a stormwater model because it defines the total amount of rainfall that reaches the catchment and, in turn, is directly linked to the total amount of estimated runoff. Typically, stormwater models use one of two approaches for modeling precipitation levels: a single storm event methodology or a multi-year, high-resolution (daily or sub-daily) continuous simulation. Each approach has its advantages and disadvantages. Event-based approaches are programmatically simple but were originally designed to simulate runoff for a single storm event size. They have also been used to estimate long term average annual runoff by modeling one average 24-hour event and extrapolating to the entire year. Continuous simulations are better able to capture the dynamic range of seasonal precipitation events, storing and applying antecedent conditions. Continuous, rather than event, simulations are generally thought to represent catchment rainfall-runoff response to the best extent practical, but these models can be computationally burdensome and costly to develop and maintain.

Consistent with the development objective of a computationally simple and robust model, the process according to many embodiments of the invention utilizes an event-based approach to calculating the expected precipitation levels, but estimates average daily runoff from multiple 24-hr events rather than using a single rainfall-runoff ratio. The process according to many embodiments of the invention calculates the precipitation level patterns by building a frequency distribution of 24-hr rainfall depths (24-hr event frequencies), and uses the average annual number of days with rain to generate the average annual runoff estimates. In certain embodiments, event-based runoff is calculated for each land use type and then aggregated using a set of storm frequency intervals to generate average annual runoff estimates. Effectively, the model of the expected precipitation levels functions as an event-based model, but uses a set of inputs designed to be representative of the distribution of the potential range of inputs used by a continuous model.

The goal in processing the precipitation data is to adequately represent the rainfall distribution with a simplified set of inputs that closely approximate the mean annual rainfall calculated for the entire dataset. In a number of embodiments, the hydrologic estimation approach utilized by the stormwater modeling systems is able to predict average annual runoff within 10% of widely accepted models that have more complex data entry requirements.

Based on historic daily rainfall data, the process according to various embodiments of the invention calculates, d, the average number of rain days per water year when daily rainfall exceeds 0.01 inches and, PPT(x), various 24-hr event frequency estimates, where PPT is the 24-hr rainfall (inches) for the xth percentile event. In many embodiments, the rainfall data is evaluated on a water year basis. In some embodiments, the process applies the trapezoid rule to estimate the integral of the 24-hr event frequency distribution and obtains a long-term average 24-hr rainfall volume for days when it rains. The process according to many embodiments of the invention approximates the integral using the following equation for non-uniform intervals of x:

$$\int_0^{100} PPT(x)dx \approx \frac{1}{2}\sum_{k=1}^{N}(x_{k+1} - x_k) * (PPT(x_{k+1}) + PPT(x_k))$$

where x is a number between 0 and 100, exclusive, k is number in the sequence of total, N, percentile events used to estimate the integral. To obtain a long-term average 365-day rainfall volume, PPT365, the process according to several embodiments of the invention multiplies the 24-hr average by the number of rain days per year, d:

$$PPT_{365} = d * \int PPT(x)dx$$

In some embodiments, the process calculates (218) the aggregate effect of water management features on the stormwater runoff and pollutant load to a set of receiving waters. In many embodiments, the stormwater model uses the gathered spatial data, water management feature data, and land and feature condition data to estimate annual runoff and pollutant loads. In some embodiments, the process also accounts for a condition of the water management feature. For example, in certain embodiments, the effectiveness of a water management feature decreases as time passes or based on the physical condition of the water management feature. The process according to several embodiments of the invention calculates the aggregate effect and/or the effects at each individual land portion based on a common scaleable unit (e.g., annual runoff, total suspended solids (TSS)). The common scaleable unit can serve as a standardized accounting unit to prioritize and track stormwater improvement actions in reducing pollutant loads to a receiving water between regions and over various periods of time.

In a number of embodiments of the invention, runoff estimates are driven by the rainfall inputs and the catchment attributes (land use, impervious area, hydrologic connectivity, soils, etc.) for rainfall-runoff transformation. The process according to several embodiments of the invention preserves hydrologic routing on the urban drainage scale and ensures consistent aggregation over hydrologically linked catchments.

In many embodiments, the stormwater modeling system relies on the Soil Conservation Service (SCS) curve number (CN) method and the approach detailed in Technical Release 55 (TR-55) to estimate runoff from small urban catchments, the disclosure of which is hereby incorporated by reference herein in its entirety. The SCS runoff equation is:

$$Q_{LU} = \frac{(PPT - I_a)^2}{(PPT - I_a) + S}$$

where QLU is the runoff depth (inches) for each land use, PPT is the 24-hr rainfall volume (inches), S is the potential maximum retention after runoff begins (inches), and $I_a$ is the initial abstraction (inches). The initial abstraction incorporates all losses before runoff begins, including water retained in surface depressions, water intercepted by vegetation, evaporation, and infiltration. Runoff does not begin until the initial abstraction has been met. $I_a$ is variable across the landscape but is highly correlated to the curve number. Curve numbers range from 30 to 98 and lower numbers indicate low potential runoff whereas higher numbers indicate increasing runoff potential. The major factors that determine SCS curve numbers are the soil permeability and infiltration classified into the NRCS HSGs, the land use (specifically, the percent impervious of the land use), and the hydrologic condition.

To simply account for variations in soil permeability and infiltration, the NRCS has classified soils into four hydrologic soil groups (HSGs). Stormwater modeling systems in accordance with several embodiments of the invention assume that all land uses have poor hydrologic condition when no parcel-scale BMPs are implemented.

Hydrologic computations according to various embodiments of the invention combine a set of metrics that describe a 30-year rainfall distribution with well-tested USDA algorithms for rainfall-runoff transformation and routing to generate average annual runoff estimates for each catchment. In several embodiments, decentralized and non-structural BMPs effects on runoff and pollutant generation are based on best available science and datasets. A hydrograph separation approach in accordance with many embodiments of the invention quantifies the water quality benefits of centralized, large-scale structural BMPs. In some embodiments, the process calculates the effectiveness of structural water management features based on the functions specific to each feature.

The process according to various embodiments of the invention calculates the aggregate effects of water management features over a range of precipitation conditions. Structural stormwater best management practices (BMPs) are designed to treat volumes generated from relatively high intensity precipitation events, but in reality accept and treat stormwater and associated pollutants across a range of runoff event magnitudes, intensities and durations. For example, the process according to many embodiments calculates the infiltrated, treated, and bypassed volumes for a water management feature using graphical methods. Separation of the infiltration volume is determined by drawing a flat line across the hydrograph at the infiltration flow rate (cfs), calculated as the product of the infiltration rate (in/hr) and the basin footprint (sq ft) with proper unit conversion. Separation of the treatment volume is defined by drawing a flat line across the hydrograph at the treatment flow rate (cfs), and depending on the BMP type, can be estimated as quotient of the treatment capacity (ac-ft) and the drawdown time (hr) with proper unit conversion. Both the infiltration volume and the treatment volume are calculated as the area of the outflow hydrograph under the respective flow rates down to zero. If the sum of the infiltrated and treated volumes is less than the total outflow volume, then the remaining volume is allocated to bypass. If the sum of the infiltrated and treated volumes is greater than the total outflow volume, then the treatment volume is reduced to accommodate the difference and the volumetric balance between inflow and outflow is retained.

In several embodiments, the stormwater modeling system can operate in either of two scenarios: baseline (without BMP implementation) and current (with BMP implementation and performance) to estimate stormwater reductions that result of cumulative BMP implementation. In both scenarios, the precipitation inputs are constant and represent the degree of hydrologic variability present in the historical record. Changes from one scenario to another for a given catchment are primarily associated with the implementation of BMPs. Runoff reductions are also normalized by catchment size for standardized comparison between catchment results within a municipality to inform spatial priorities.

In many embodiments, the calculated aggregate effect is presented as a score or description of each parcel's effect on a receiving water. Parcel effect according to certain embodiments of the invention is a measure of runoff neutrality. A parcel is determined to be 'runoff neutral' when standardized visual observations indicate that much of the precipitation falling on the parcel does not leave as runoff. There are many combinations of actions or practices that can be implemented on an urban parcel to achieve runoff neutrality. Parcel improvements are practical to implement and, if implemented over high density of parcels within a catchment, they can begin to restore the natural hydrograph of the landscape by diffusing stormwater infiltration throughout a catchment.

Many of the examples and steps are described with reference to stormwater runoff volumes. However, in many embodiments, similar calculations are used to measure pollutant load. Particulates are modelled via land-use based characteristic runoff concentrations to represent the hydrophobic urban-derived pollutants. The process of many embodiments can accommodate multi-pollutant modeling, focused on stormwater runoff volumes (average annual runoff (volume per year)) and particulate pollutant loads (mass per year). The prominent role that stormwater surface runoff has on both the hydrology and pollutant loading to receiving waters makes the focus, quantification and tracking of effective urban land management actions in the context of surface runoff reductions extremely powerful and informative. In addition, modeling and monitoring of stormwater volumes can be done more accurately and more precisely at orders of magnitude less cost than the cost to sample, analyze, manage and report on a pollutant by pollutant basis.

The process according to some embodiments of the invention calculates a total suspended solids (TSS) value as a surrogate for particulate pollutants. Most urban pollutants of concern are hydrophobic, and their fate and transport in the environment is similar to particulates rather than dissolved pollutants. Hydrophobic pollutants include, but are not limited to, trace metals (e.g., zinc, copper, iron, arsenic, etc.); hydrocarbons (e.g., oil and grease, benzene, toluene, xylene, etc.); total and dissolved phosphorous; and pathogens (e.g., fecal coliform, total coliform, etc.). Since pollutant loads are strongly dependent upon volumes, attempting to capture the short-term variability in pollutant concentrations is less important for the process according to many embodiments of the invention. In several embodiments, the process uses static runoff concentrations for different land-uses.

The process according to some embodiments calculates the particulate catchment loads for the baseline and mitigated scenarios as the product of the stormwater volume and a pollutant concentration using the following general equation:

$$\text{Pollutant Load} \left(\frac{\text{mass}}{\text{time}}\right) = \text{stormwater runoff} \left(\frac{\text{volume}}{\text{time}}\right) * \text{pollutant concentration} \left(\frac{\text{mass}}{\text{volume}}\right)$$

In some embodiments, the process uses a single characteristic runoff concentration (CRC) to describe the pollutant concentration for each land use, consistent with the approaches that have been successfully employed by other regional stormwater mitigation tracking models. A CRC is defined as the expected average annual pollutant concentration generated from a land use in a particular condition across a range of event types. While similar to event mean concentration (EMC) values commonly applied in stormwater modeling, CRCs are intended to be an annual volume weighted average of EMC values. The use of CRCs simplifies and focuses the pollutant generation algorithms in a manner that aligns with the need to isolate the signal of effective management practices in a manner that can be objectively measured and verified.

By focusing computations on runoff reductions from sustainable and effective improvements on parcels and pollutant concentration reductions on paved roads, the process according to certain embodiments aligns the land use conditions and their associated influence on the average annual catchment loads. This approach also allows for the verification of model inputs using land use condition observations. If non-structural BMPs are effectively implemented over the majority of the urban land area (and these improved land conditions can be observed and verified) within an urban catchment, they are anticipated to have substantial and measurable runoff and/or load reduction at the catchment discharge point.

The process according to certain embodiments of the invention manages (220) the stormwater effects based on the calculated effects of the water management features. Each year, municipalities can track and communicate estimated reductions delivered to receiving waters because of management actions. Mapped comparisons of current stormwater runoff and pollutant loading rates across catchments inform the current water quality improvement opportunities and identify changing patterns as management actions are implemented. This information helps local governments iteratively manage infrastructure and plan for capital improvement investments on time scales that align with their budgets and decision-making processes.

In many embodiments, the process manages the stormwater effects by managing the condition of land areas and/or water management features. For example, the condition of a land area may be managed through management practices that reduce stormwater effects, such as (but not limited to) redirecting water outputs to lawns, building structural BMPs, and installing rain barrels. Reductions in the water quality impacts of paved roadways can be achieved by effective street sweeping programs, maintenance of pavement condition and other water quality minded road management practices. In some embodiments, the benefits of effective paved road condition improvements in the process are quantified by adjusting road characteristic runoff concentration (CRC) values, which represent a concentration for a pollutant of concern in stormwater runoff from a specific urban land use and its associated condition. The condition of roads in accordance with some embodiments of the invention is sustained by effective management practices, such as (but not limited to) modifying street sweeping schedules, organizing trash pickups, and repairing road surfaces, which reduce pollutant accumulation and subsequent transport.

In some embodiments, the process manages the stormwater runoff by providing various recommendations for water management based on the calculated runoff volumes including, but not limited to water management features to be installed, schedules for street sweeping, and policies to be enforced. The process according to several embodiments of the invention iteratively calculates the aggregate effects of different sets of water management features to identify effective strategies for reducing stormwater runoff. In certain such embodiments, the process is provided with a cost constraint and costs are associated with a cost to implement. The process according to some such embodiments then identifies a best set of water management features to maximize the stormwater runoff reduction within a given cost constraint.

The process according to certain embodiments of the invention provides a user of the system with a visual, spatial representation of the sources of runoff at varying levels of specificity. The visual representation according to certain embodiments provides a tool that allows the user to identify runoff sources based on a receiving water, catchment, and/or parcel.

In many embodiments, the process manages the stormwater runoff directly by modifying different water management features directly. For example, in some embodiments, the process manages the stormwater runoff by using remote controllers and communication systems to modify existing water management features. While a specific example of a process for modeling stormwater runoff is described above, one of ordinary skill in the art can appreciate that various steps of the process can be performed in different orders and that certain steps may be optional according to some embodiments of the invention. As such, it should be clear that the various steps of the process could be used as appropriate to the requirements of specific applications.

Systems for Modeling Stormwater Runoff

The system for modeling stormwater runoff in accordance with many embodiments of the invention allows simple and consistent management, storage and instant recall of BMP implementation, effectiveness and associated catchment results. The platform allows users to easily assess stormwater runoff and particulate pollutant load changes at different spatial scales. Municipal users can also access and export their data at any time for additional management and reporting needs.

Figure 3:
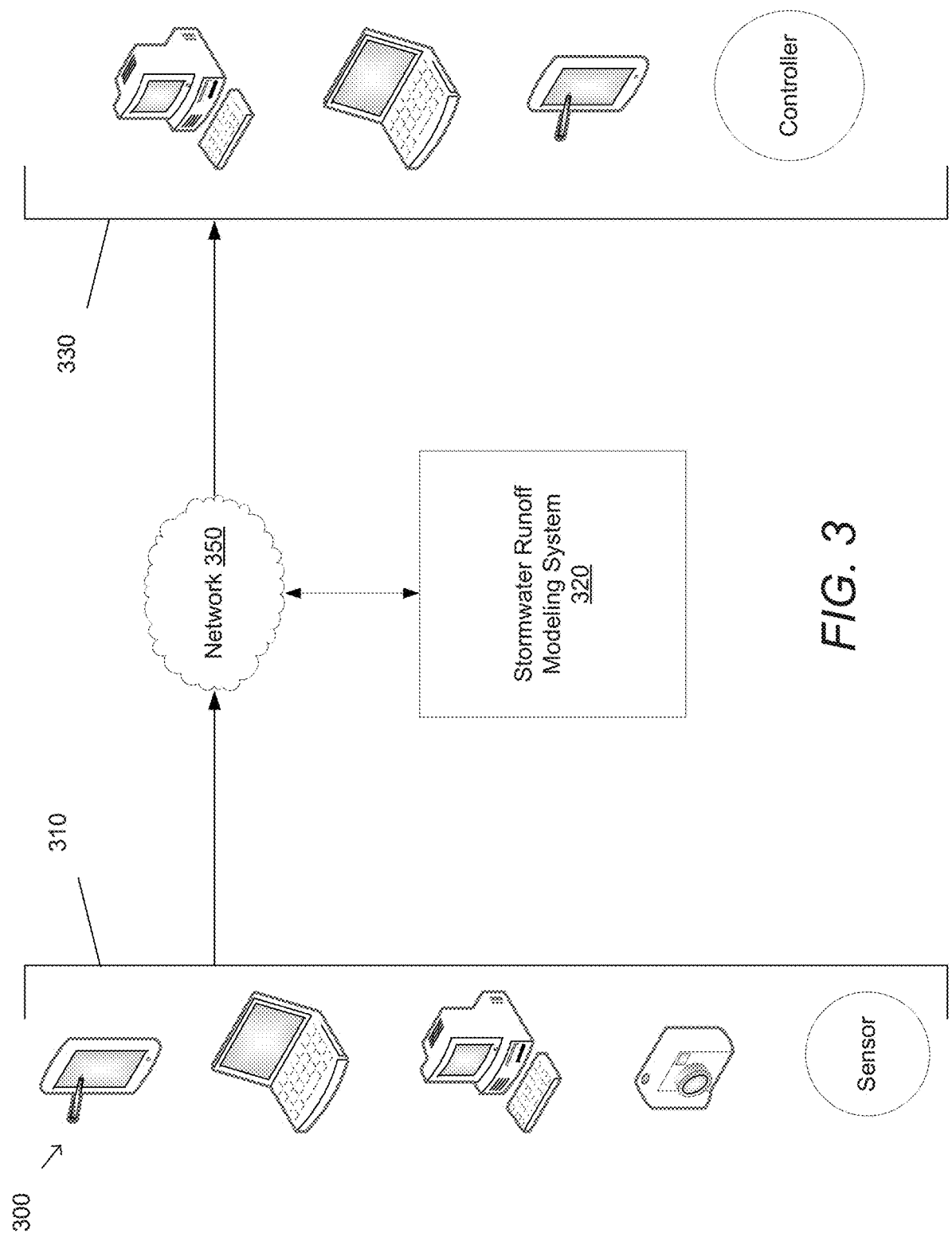
FIG. 3 is a system diagram illustrating an example of a system for modeling stormwater runoff in accordance with an embodiment of the invention.

An example of a system for managing stormwater runoff environments is illustrated in FIG. 3. Use of stormwater modelling systems in accordance with certain embodiments of the invention can provide information concerning the aggregated effects of various water management features that affect the stormwater runoff levels of a particular geographic area. Water management features according to various embodiments of the invention include various elements and/or processes that affect stormwater runoff levels including (but not limited to) structural stormwater best management practices (BMPs). System 300 includes various data gathering elements 310, a stormwater modeling system 320, and management elements 330. The data gathering elements 310, stormwater modeling system 320, and management elements 330 are connected by a network 350.

Network 350 can be, but is not limited to, the Internet, a local area network, a wireless local area network, wide area network, a software defined network, and/or any other type or combination of types of network as appropriate to the requirements of a given application. Although the example of FIG. 3 shows a single network 350, multiple networks may be used for communications between various elements of the system. For example, in some embodiments, stormwater modeling system 320 communicates with data gathering elements 310 through a first network and communicates with management elements 330 through a different second network. Network communications may also include communications with other elements, such as (but not limited to) external data sources for municipal data.

Data gathering elements 310 according to several embodiments of the invention include various types of devices for gathering data (e.g., regarding the water management features, land parcels, precipitation levels, etc.) for the modeling of stormwater rainfall runoff. In some embodiments, data gathering elements 310 include various computing devices such as (but not limited to) mobile phones, tablet computers, desktop computers, and laptop computers. Alternatively, or conjunctively, the data gathering elements 310 according to some embodiments include recording devices and sensors, such as (but not limited to) cameras and water level sensors, that can be used to automate and/or standardize the capture of data.

Stormwater modeling system 320 according to some embodiments of the invention performs various methods for modeling the stormwater runoff of geographic areas. Stormwater modeling systems in accordance with many embodiments of the invention are implemented using computing systems that can take any of a variety of forms from personal computers to cloud based services. The stormwater modeling systems of some embodiments include a data storage for storing data gathered from the data gathering elements, as well as other data generated by the stormwater modeling system, such as (but not limited to) predicted precipitation levels, projected stormwater runoff, projected pollutant levels, and water management proposals.

Management elements 330 are configured include various devices to provide the results of the stormwater modeling system 320 according to various embodiments of the invention. The results can be used by a variety of different users, such as (but not limited to) regulators, city managers, and maintenance crews for the water management features. In the example of FIG. 3, management elements 330 also include a controller that can be used to directly modify characteristics of a water management feature in some embodiments. For example, in some embodiments, the controller modifies a BMP based on the expected runoff.

Although the data gathering elements 310, stormwater modeling system 320, and management elements 330 are shown as separate elements in this particular example, the distinction between the various roles is not necessarily so distinct. For example, in some embodiments, the management elements 330 also operate as data gathering elements. The management elements 330 in accordance with embodiments perform at least a portion of the data modeling of the stormwater runoff system. In this example, stormwater modeling system 320 is illustrated as a single system, however, the runoff modeling system 320 according to other embodiments of the system is a distributed system with processing and storage elements that are distributed across several locations, such as (but not limited to) the cloud, server clusters, and other data gathering and/or management devices operated in the field. Stormwater modeling systems in accordance with several embodiments of the invention are implemented as web-based applications that communicate with a complete data management system to simplify use and automatically generate map based results.

While a specific example of a system for modeling stormwater runoff is described above, one of ordinary skill in the art can appreciate that many different configurations or devices could be used as appropriate to the requirements of specific applications. Various elements of an example of a stormwater modeling system are described in greater detail below.

Figure 4:
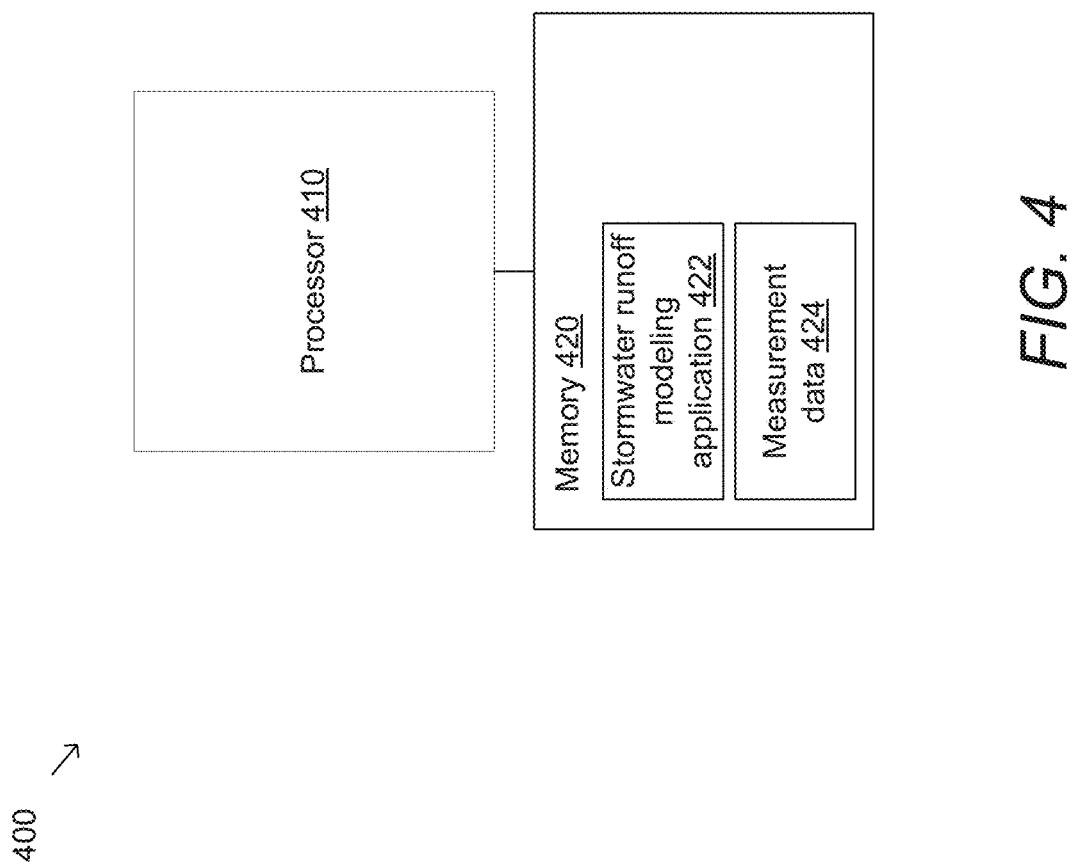
FIG. 4 is a block diagram illustrating a stormwater modeling system in accordance with an embodiment of the invention.

A stormwater modeling system in accordance with an embodiment of the invention is conceptually illustrated in FIG. 4. The goal of stormwater modeling systems implemented in this manner is to provide an easy to use platform for stormwater managers to prioritize stormwater reduction actions, efficiently manage inputs and results, and track and report estimated benefits of actions implemented across the urban landscape over time. The stormwater modeling system 400 includes a processor 410 and a memory 420. Memory 420 includes a stormwater modeling application 422 and a measurement data storage 424. The stormwater modeling application 422 according to some embodiments executes on processor 410 to model stormwater runoff by gathering data in measurement data storage 424 and analyzing the data in various ways including (but not limited to) modeling future precipitation levels, modeling the effectiveness of various water management features, identifying priorities for maintaining and instituting water management features, and modifying water management features to reduce stormwater runoff. As can readily be appreciated, the specific computing system utilized to implement a stormwater modeling system will typically depend upon the requirements of a given application.

The system according to several embodiments of the invention provides a user interface that is spatially based, using urban catchments to communicate how stormwater runoff is generated and routed through an MS4. Seamless integration with a stormwater BMP inventory and tracking system provides municipalities a stormwater quality asset management system that facilitates consistent quantification of water quality benefits of program actions. The user interface according to various embodiments of the invention provide spatial outputs that clearly communicate patterns of stormwater impacts to identify the greatest volume and load reduction opportunities within the urban area and allow managers to objectively prioritize actions. The annual results explicitly incorporate the need for maintenance, creating an information feedback loop that facilitates effective asset management over time. The stormwater suite allows users to compare alternatives during the planning phase to inform the tradeoffs and benefits of various strategies to reduce urban impacts to receiving water quality. The intuitive interface simplifies website navigation and improves consistency and repeatability across users who are not modelling experts. In many embodiments, the system automatically generates results in standardized formats by mapping where actions are implemented and quantifying the relative effectiveness of those actions, providing an objective and transparent approach to urban land management accounting.

Figure 5:
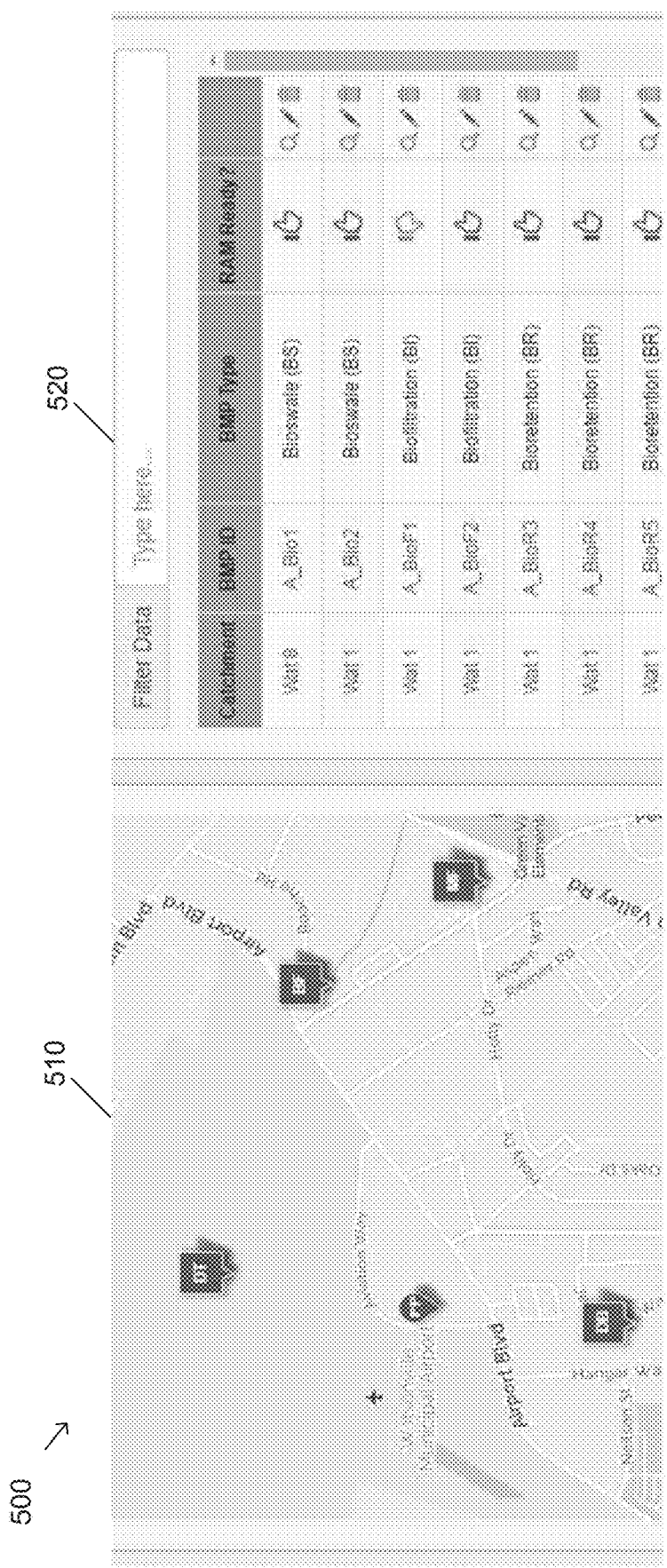
FIG. 5 illustrates a user interface for viewing inventoried structural BMP assets.

In several embodiments, the stormwater runoff management system provides user interfaces for gathering data about the land and water management features, as well as for reporting and displaying the results of the runoff modeling system. A user interface according to various embodiments of the invention for a customized, web-based, asset management tool for stormwater managers to inventory and evaluate the relative conditions of structural BMPs is illustrated in FIG. 5. In this example, user interface 500 includes a map 510 and a structural BMP inventory 520. The map according to some embodiments of the invention illustrates the geographic location of various structural BMPs within a specified area. In some embodiments, structural BMPs are shown differently based on a type, condition, and/or status (i.e., whether the structural BMP has been assessed) of the structural BMP. In some embodiments, the user interface allows a user to navigate to any catchment (e.g., from a map view or a tabular view) to review the specific model inputs for the years of record and view the spatial locations and respective conditions of the implemented BMPs.

The visualization of existing water features allows for the condition of the existing water features to be reviewed and edited so that users can view the mapped attributes for each catchment. In several embodiments, the user interface allows a user to toggle views of urban drainages, catchment soil types, land use distribution, and catchment imperviousness. These maps provide additional information to stormwater managers as they plan implementation strategies in various areas within their MS4. In many embodiments, the map view can be adjusted to view structural BMPs at various zoom levels, or at various hierarchical levels including (but not limited to) a municipality, a receiving water, a catchment, and a parcel. Structural BMP inventory 520 according to several embodiments of the invention provides a tabular view of the structural BMPs displayed in the map 510.

In some embodiments, the user interface allows a user to determine the maintenance urgency to ensure that the water quality benefit is being sustained at an acceptable level over time. Assessment methods for evaluating the condition of water management features facilitate the rapid field evaluation of any structural BMP or water management feature. In many cases, the capability of a structural BMP to perform its treatment function and provide water quality benefits will typically decrease over time unless maintenance actions are performed. For example, at a certain threshold of pollutant accumulation, which varies from one structural BMP to another, the functional efficiency of passive treatment processes in the structural BMP will be drastically decreased. Poorly maintained structural BMPs have been observed to become so degraded that they simply provide a temporary storage of pollutants of concern where they can be easily entrained by subsequent storm flows.

In order to address the effects of the condition of a water management feature, assessment methods in accordance with various embodiments of the invention provide a complete and consistent field evaluation and data management tool for jurisdictions to determine the urgency of maintenance, track condition over time, and maintain the intended water quality benefits of structural BMPs.

User interface 500, in accordance with several embodiments, allows users to quickly inventory, determine, and track the condition of structural BMPs. Assessment results can be used to track structural BMP distribution and conditions over time, prioritize BMPs for maintenance, and report programmatic progress. In many embodiments, the standardized and efficient methods for gathering and inputting structural BMP data are directly applicable for stormwater managers to evaluate and track the condition of stormwater structural BMPs in any location with minimal subjective decision making or local calibration.

The interface and description described above are directed to the inventory and evaluation of structural BMPs. Similar interfaces can be applied to other elements of the stormwater model, including (but not limited to) land parcels, non-structural BMPs, roads, and trash. As can readily be appreciated, the specific assessment methods and user interfaces utilized to assess and gather data various types of water management features will typically depend upon the requirements of a given application.

Figure 6:
FIG. 6 illustrates a view of a user interface for viewing mapped baseline runoff impact results.

Once data for the water management features has been gathered, the system according to several embodiments of the invention provides various reports and visualizations to inform water management strategies and priorities going forward. An example of a municipal view 600 that displays priority mapping results is provided in FIG. 6, which illustrates catchments with relatively higher stormwater volume delivery to the receiving waters based on current conditions.

In the municipal view 600, the color-coded runoff and particulate maps shows the results (baseline or current) normalized by the area of the catchment for direct comparisons of runoff and loading rates across catchments. The baseline and current volumes and loads are also used to provide users with information to inform spatial priorities within their municipality. The population of the runoff and loading rates are ranked and evenly distributed across five categories and mapped using standardized color gradations.

In several embodiments, catchments are presented with different appearances (e.g., different colors, textures, borders, etc.) to indicate which the surface runoff of the various catchments to the receiving waters on an average annual basis. In this example, the darker shades of color indicate that a greater proportion of surface runoff (e.g., the highest runoff rate per unit area) to receiving waters on an average annual basis. These catchments present opportunities for the municipality to implement actions where the greatest receiving water benefits are expected. In many embodiments, the user interface of municipal view 600 allows users to easily toggle between the baseline and current priority maps for all saved years of record. The ability to view results spatially and by receiving water provides additional functionality for managers to intersect the stormwater modeling results with other spatial datasets to inform more strategic planning efforts. Examples of other complementary spatial datasets include (but are not limited to) locations of groundwater overdraft, groundwater recharge zones, downstream biological impairments, funding opportunities, etc.

The system according to some embodiments of the invention provides various tools for planning and evaluating plans for managing stormwater runoff for a municipality. Exemplary user interfaces for generating and evaluating planning scenarios according to several embodiments of the invention are described below.

Figure 7:
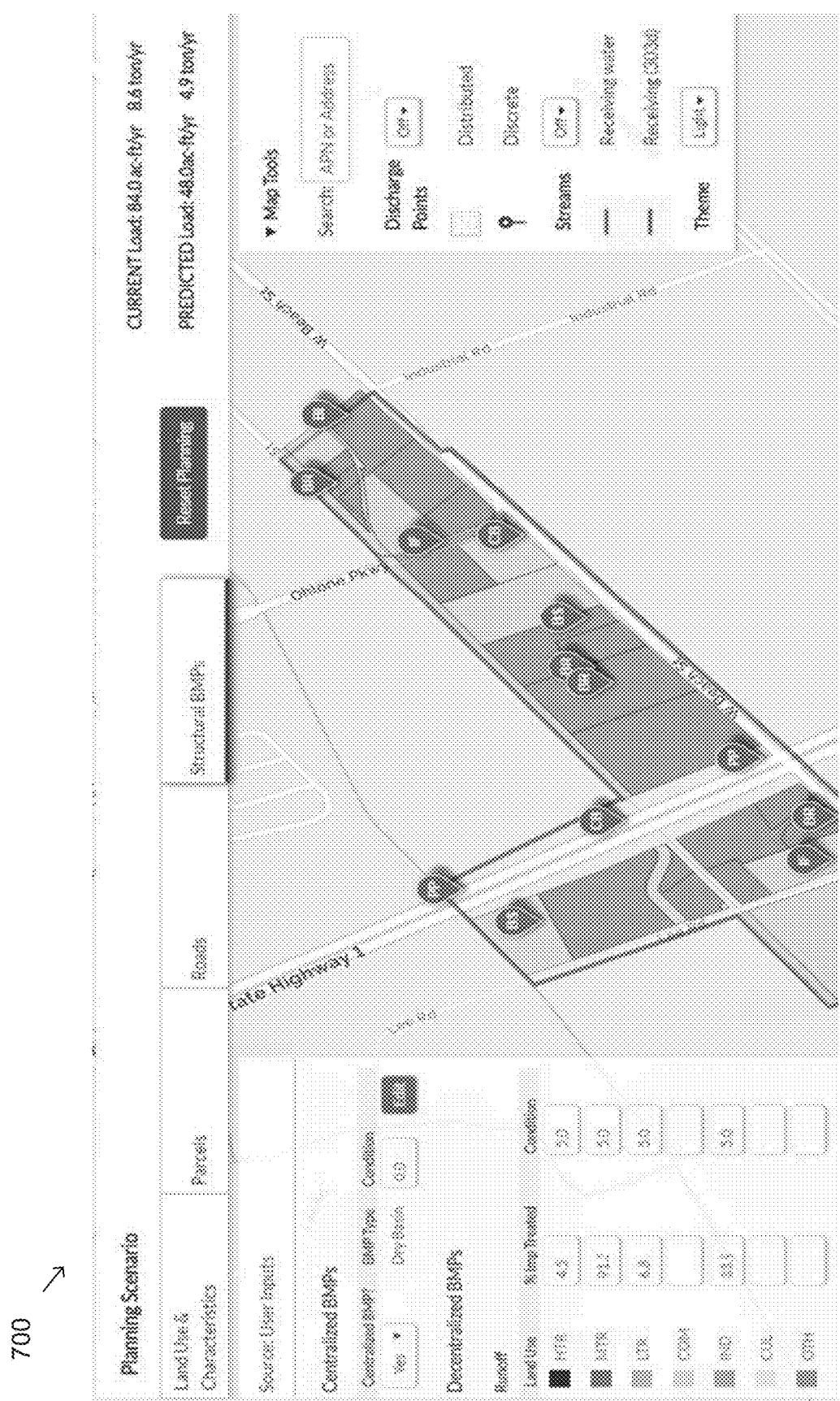
FIG. 7 illustrates a user interface for generating planning scenarios in accordance with an embodiment of the invention.

A user interface 700 for generating planning scenarios with various water management features and land modifications is illustrated in FIG. 7. Planning scenarios can be completed for any catchment via manual entry of parcel, road and structural BMP design characteristics and conditions. Predicted loading results are automatically generated based on user inputs of runoff neutral parcels, road condition, distribution and condition of runoff and particulate decentralized BMPs, and sizing and condition of centralized BMPs. Catchment runoff and loading estimates from different water quality improvement scenarios can be compared to assess the relative runoff and pollutant loading mitigation effects of various design alternatives. In some embodiments, user interface for generating planning scenarios allows for viewing an estimated cost for the planning scenario and/or an allowed budget for the planning scenario.

The user interface in accordance with various embodiments of the invention allow for the tracking of progress in a manner that is consistent and standardized, making the determination of a planning scenario's effectiveness easy to communicate and understand. In many embodiments, the stormwater modeling system provides visualizations of proposed water management features and resulting projected runoff load reductions generated by a stormwater modeling system.

Figure 8:
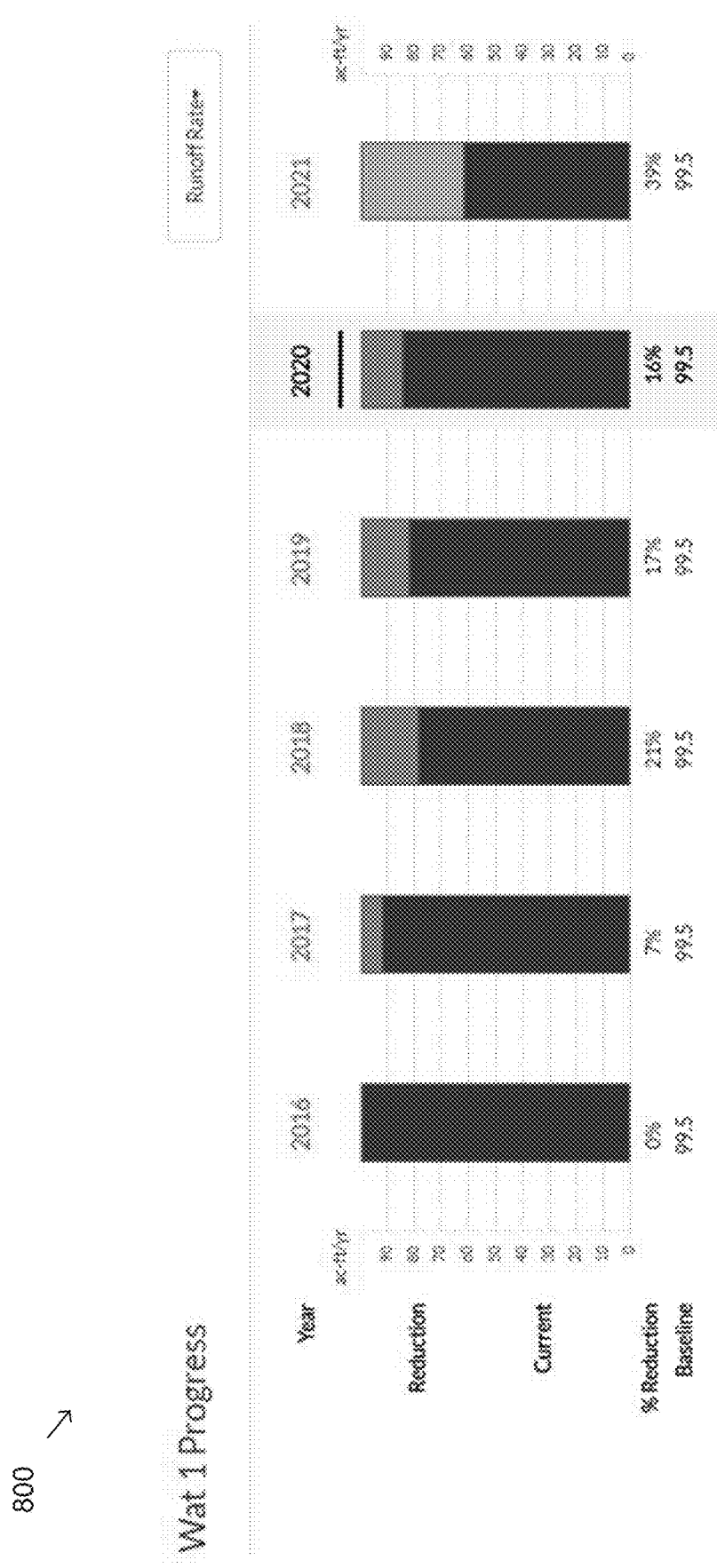
FIG. 8 is a bar chart that illustrates annual baseline load, current load, and current load reduction estimates for an urban catchment.

A bar chart 800 that provides the annual baseline load, current load and current load reduction estimates for a catchment is illustrated in FIG. 8. Baseline refers to the average annual runoff (volume per year) or particulates (mass per year) delivered from the respective catchment(s) to receiving waters with no BMPs present. The baseline volumes and loads will increase when new development occurs and/or impervious area within the MS4 boundary is increased, requiring the user to upload the revised spatial information. Current runoff and loading estimates are made using the same catchment characteristics and precipitation inputs as the baseline estimates, but with the inclusion of water management features, such as (but not limited to) non-structural and structural BMPs.

In the bar chart 800, all catchment results are aggregated to provide a measure of the stormwater program progress over time. In many embodiments, this progress is quantified as average annual reductions in surface runoff and particulate pollutant loads to receiving waters. An effective stormwater program will have increasingly lighter colored bars over time, representing successful load reduction progress. The historic and forward looking views allow a user to document progress of various water management features and communicates programmatic priorities for a municipality or receiving water.

Figure 9:
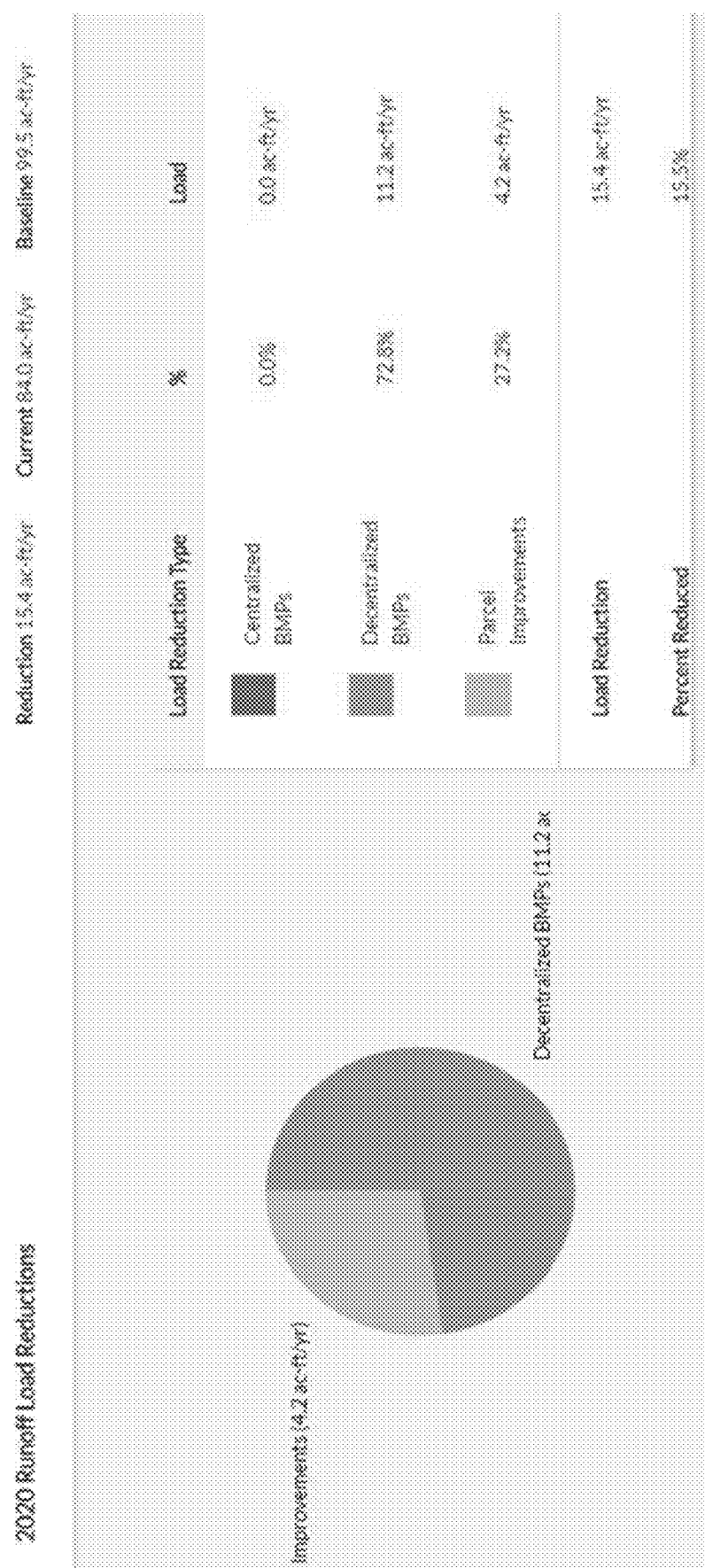
FIG. 9 illustrates an example of an annualized summary of the load reduction contributions of various water management features in accordance with an embodiment of the invention.

An annualized summary of the load reduction contributions of various elements of a planning scenario is illustrated in FIG. 9. The summary 900 of this example shows the relative reductions resulting from improvements parcels and roads, as well as from decentralized and centralized structural BMPs. Additional examples, screenshots and descriptions of user interfaces according to several embodiments of the invention are provided in "ParcelRAM: Technical and User Guidance Document v1" (available at https://2ntelr-.com/parcelram/dist/prod/data/ParcelRAMTechDoc_Web-.pdf), "BMP RAM: User Guidance v3.2" (available at http://www.2ndnaturellc.com/wp-content/uploads/2016/09/BMPRAMUserGuidance3.1.pdf), "BMP RAM: Technical Document v3.1" (available at http://www.2ndnaturellc.com/wp-content/uploads/2016/11/BMPRAMv3-1_TechnicalDoc_Nov2016.pdf), and "BMP RAM: Field Protocols v3.1" (available at http://www.2ndnaturellc.com/wp-content/uploads/2016/09/BMPRAMFieldProtocols3.1.pdf), which are submitted herewith via Information Disclosure Statement and incorporated herein by reference.

While the above description contains descriptions of many specific systems and methods for modeling stormwater runoff in accordance with various embodiments of the invention, these should not be construed as limitations on the scope of the invention, but rather as an example of one embodiment thereof. Additional details, examples, and embodiments are described in "Stormwater Tool to Estimate Load Reductions: Final Technical Document v1.1" (available at http://www.2ndnaturellc.com/documents/swTEL-R_TechDoc.pdf), which is submitted herewith via Information Disclosure Statement and incorporated herein by reference. Accordingly, the scope of the invention should not be limited to the discussion of any specific embodiment that is illustrated are described.

What is claimed is:

1. A method for managing water and pollutant management elements of a geographic area, the method comprising:
    gathering spatial data describing a set of land portions, wherein the spatial data comprises pollutant load data that describes pollutant loads for the set of land portions;
    gathering management element data for a set of water and pollutant management elements, wherein the management element data comprises:
        element characteristic data that describes a set of characteristics of the set of water and pollutant management elements;
        element condition data that describes a condition of each of the set of water and pollutant management elements; and
        a history of water and pollutant management element implementations for the set of land portions for a plurality of points in time;
    gathering routing and connectivity data that describes routing and connectivity between the set of land portions and the set of water and pollutant management elements;
    calculating precipitation level patterns via a probabilistic approach using metrics that describe precipitation frequency distributions;
    calculating spatially distributed runoff and pollutant loading patterns based on the calculated precipitation level patterns, the spatial data, and the management element data, wherein the spatially distributed runoff and pollutant loading patterns comprise a magnitude of runoff and pollutant;
    calculating an aggregate effect of the set of water and pollutant management elements based on the calculated spatially distributed runoff and pollutant loading patterns and the routing and connectivity data; and
    managing the set of water and pollutant management elements based on the calculated aggregate effect, wherein the set of water and pollutant management elements comprises a set of physical features installed to reduce stormwater runoff volumes and treat stormwater pollutants.

2. The method of claim 1, wherein the spatial data comprises at least one of land surface type, soil type, precipitation levels, topography, hydrologic connection to receiving waters, traffic levels, and land use type.

3. The method of claim 1, wherein the management element data comprises at least one of the size of a water and pollutant management element, types of outflow from the water and pollutant management element, construction materials used to construct the water and pollutant management element, and outflow rates from the water and pollutant management element.

4. The method of claim 1, wherein the spatial data comprises spatial condition data, wherein gathering the spatial condition data comprises performing a set of standardized assessment methods on each land portion in a geographic area.

5. The method of claim 1, wherein gathering management element data comprises performing a set of standardized assessment methods on each water and pollutant management element in a geographic area to determine a condition of the water and pollutant management element.

6. The method of claim 1, wherein calculating the precipitation level patterns comprises calculating an annualized statistical distribution of rainfall events of a geographic area.

7. The method of claim 1, wherein calculating the aggregate effect comprises discounting the effectiveness of a particular water and pollutant management element based on a condition of the particular water and pollutant management element from the element condition data.

8. The method of claim 1, wherein calculating the aggregate effect comprises calculating a flow route across a plurality of land portions of the set of land portions and through at least one of the set of water and pollutant management elements based on the routing and connectivity data.

9. A system for managing water and pollutant management elements of a geographic area, the system comprising:
- a data gathering interface for gathering spatial data describing a set of land portions, management element data for a plurality of water and pollutant management elements, and routing and connectivity data describing routing and connectivity between the set of land portions and the plurality of water and pollutant management elements, wherein:
  - the spatial data comprises pollutant load data that describes pollutant loads for the set of land portions; and
  - the management element data comprises:
    - element characteristic data that describes a set of characteristics of the plurality of water and pollutant management elements;
    - element condition data that describes a condition of each of the plurality of water and pollutant management elements; and
    - a history of water and pollutant management element implementations for the set of land portions for a plurality of points in time;
- a stormwater modeling system for:
  - calculating precipitation level patterns via a probabilistic approach using metrics that describe precipitation frequency distributions;
  - calculating spatially distributed runoff and pollutant loading patterns based on the calculated precipitation level patterns, the spatial data, and the management element data, wherein the spatially distributed runoff and pollutant loading patterns comprise a magnitude of runoff and pollutant; and
  - calculating an aggregate effect of the plurality of water and pollutant management elements based on the calculated spatially distributed runoff and pollutant loading patterns and the routing and connectivity data; and
- a system management interface for managing the plurality of water management elements based on the calculated aggregate effect, wherein the plurality of water and pollutant management elements comprises a set of physical features installed to reduce stormwater runoff volumes and treat stormwater pollutants.

10. The system of claim 9 further comprising a network, wherein a set of devices communicate with the stormwater modeling system through the data gathering interface over the network.

11. The system of claim 10, wherein the set of devices comprises at least a database server, a personal computer, and a sensor for measuring stormwater runoff.

12. The system of claim 9, wherein the system management interface is configured to communicate with at least one controller for modifying an element of the system.

13. The method of claim 1, wherein the history of water and pollutant management element implementations further comprises the calculated aggregate effect of each water and pollutant management element implementation, wherein managing water and pollutant management elements comprises:
- displaying the calculated aggregate effect for water and pollutant management element implementations at multiple different points in time;
- identifying a water and pollutant management element to be managed; and
- modifying the identified water and pollutant management element.

* * * * *